United States Patent
Eronen et al.

(10) Patent No.: US 10,346,007 B2
(45) Date of Patent: Jul. 9, 2019

(54) ASSOCIATION BETWEEN A CONTENT ITEM DISPLAYED ON A BEAD DISPLAY APPARATUS AND A TAG

(71) Applicant: Nokia Technologies Oy, Espoo (FI)

(72) Inventors: Antti Eronen, Tampere (FI); Arto Lehtiniemi, Lempäälä (FI); Juha Arrasvuori, Tampere (FI); Jukka Holm, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 225 days.

(21) Appl. No.: 15/031,287

(22) PCT Filed: Oct. 28, 2013

(86) PCT No.: PCT/FI2013/051016
§ 371 (c)(1),
(2) Date: Apr. 22, 2016

(87) PCT Pub. No.: WO2015/063362
PCT Pub. Date: May 7, 2015

(65) Prior Publication Data
US 2016/0239182 A1 Aug. 18, 2016

(51) Int. Cl.
*G06F 3/0484* (2013.01)
*G06F 16/48* (2019.01)
(Continued)

(52) U.S. Cl.
CPC .......... *G06F 3/04842* (2013.01); *G06F 1/163* (2013.01); *G06F 1/1692* (2013.01);
(Continued)

(58) Field of Classification Search
CPC ....... G06F 1/163; G06F 1/1647; G06F 1/1649
See application file for complete search history.

(56) References Cited

U.S. PATENT DOCUMENTS 5,757,929 A 5/1998 Wang et al.
6,216,490 B1 4/2001 Radley-Smith
(Continued)

FOREIGN PATENT DOCUMENTS

CN 102077161 A 5/2011
CN 102722323 A 10/2012
(Continued)

OTHER PUBLICATIONS

Wacharamanotham et al., "The Interactive Bracelet: An Input Device for Bimanual Interaction", MobileHCI, Sep. 7-10, 2010, 4 pages.
(Continued)

*Primary Examiner* — Sepehr Azari
(74) *Attorney, Agent, or Firm* — Alston & Bird LLP

(57) ABSTRACT

A method comprises receiving information associated with a first content item, designating a first bead apparatus (842) to be associated with the first content item, the first content item being identified by a first content item identifier, causing display of a visual representation of the first content item identifier by the first bead apparatus on a display of the first bead apparatus, receiving information indicative of a content item selection input of the first bead apparatus indicative of selection of the first content item, receiving input indicative of a tag selection input that identifies a tag, and causing an establishment of an association between the first content item and the tag based, at least in part, on the tag selection input. The tag selection input may relate to a tap input associated with the bead apparatus, a rotation input associated with the bead apparatus, and/or the like.

20 Claims, 13 Drawing Sheets

(51) Int. Cl.
*G06F 3/0346* (2013.01)
*G06F 1/16* (2006.01)
*G06F 3/14* (2006.01)
*G06F 3/01* (2006.01)

(52) U.S. Cl.
CPC ............ *G06F 1/1694* (2013.01); *G06F 3/017* (2013.01); *G06F 3/0346* (2013.01); *G06F 3/14* (2013.01); *G06F 16/48* (2019.01); *G09G 2340/14* (2013.01); *G09G 2354/00* (2013.01); *G09G 2360/04* (2013.01)

(56) References Cited

U.S. PATENT DOCUMENTS

| | | |
|---|---|---|
| 6,920,606 B1 | 7/2005 | Jablonski et al. |
| 8,098,141 B2 | 1/2012 | Vanska et al. |
| 8,872,729 B2 | 10/2014 | Lyons et al. |
| 9,122,249 B2 | 9/2015 | Lyons et al. |
| 9,696,690 B2 | 7/2017 | Nguyen et al. |
| 2003/0030595 A1 | 2/2003 | Redley-Smith |
| 2005/0052852 A1 | 3/2005 | Ono |
| 2005/0113081 A1 | 5/2005 | Tushinsky et al. |
| 2005/0132290 A1 | 6/2005 | Buchner et al. |
| 2005/0174302 A1 | 8/2005 | Ishii |
| 2007/0075915 A1 | 4/2007 | Cheon et al. |
| 2007/0279852 A1 | 12/2007 | Daniel et al. |
| 2008/0001764 A1 | 1/2008 | Douglas et al. |
| 2008/0318636 A1 | 12/2008 | Kim |
| 2009/0104931 A1 | 4/2009 | Chiang |
| 2009/0251419 A1 | 10/2009 | Radley Smith |
| 2009/0273560 A1 | 11/2009 | Kalanithi et al. |
| 2010/0004037 A1 | 1/2010 | Ozawa |
| 2010/0029327 A1 | 2/2010 | Jee |
| 2010/0064536 A1 | 3/2010 | Caskey et al. |
| 2010/0217667 A1 | 8/2010 | Mo |
| 2010/0228691 A1 | 9/2010 | Yang et al. |
| 2011/0059769 A1 | 3/2011 | Brunolli |
| 2011/0102354 A1 | 5/2011 | Fuyuno et al. |
| 2011/0157022 A1 | 6/2011 | Goldburt |
| 2011/0193805 A1 | 8/2011 | Park et al. |
| 2011/0209102 A1* | 8/2011 | Hinckley .............. G06F 3/0483 715/863 |
| 2011/0291964 A1 | 12/2011 | Chambers et al. |
| 2012/0021684 A1 | 1/2012 | Schultz et al. |
| 2012/0075173 A1 | 3/2012 | Ashbrook et al. |
| 2012/0242596 A1 | 9/2012 | Sip |
| 2013/0024805 A1 | 1/2013 | In et al. |
| 2013/0044215 A1 | 2/2013 | Rothkopf et al. |
| 2013/0173658 A1 | 7/2013 | Adelman et al. |
| 2013/0222270 A1 | 8/2013 | Winkler et al. |
| 2013/0222271 A1 | 8/2013 | Alberth et al. |
| 2013/0271350 A1 | 10/2013 | Lyons |
| 2013/0271355 A1 | 10/2013 | Lyons et al. |
| 2013/0271389 A1 | 10/2013 | Lyons et al. |
| 2013/0271390 A1 | 10/2013 | Lyons et al. |
| 2013/0271392 A1 | 10/2013 | Lyons |
| 2013/0271495 A1 | 10/2013 | Nguyen et al. |
| 2014/0047379 A1 | 2/2014 | Urawaki et al. |
| 2014/0172548 A1 | 6/2014 | Garlick |
| 2014/0281956 A1* | 9/2014 | Anderson ............. G06F 3/0482 715/702 |
| 2015/0185884 A1 | 7/2015 | Magi |
| 2015/0258458 A1 | 9/2015 | Ihang et al. |
| 2016/0117006 A1 | 4/2016 | Lehtiniemi et al. |
| 2016/0239182 A1 | 8/2016 | Eronen et al. |
| 2016/0266660 A1 | 9/2016 | Eronen et al. |
| 2016/0266858 A1 | 9/2016 | Eronen et al. |

FOREIGN PATENT DOCUMENTS

| | | |
|---|---|---|
| CN | 102891925 A | 1/2013 |
| EP | 1259135 A1 | 11/2002 |
| EP | 1311126 A2 | 5/2003 |
| EP | 1 259 135 B1 | 9/2006 |
| EP | 1754424 A1 | 2/2007 |
| EP | 1998260 | 12/2008 |
| EP | 2154662 A2 | 2/2010 |
| EP | 2368455 A1 | 9/2011 |
| EP | 2372984 A1 | 10/2011 |
| EP | 2474168 A2 | 7/2012 |
| EP | 2549480 | 1/2013 |
| GB | 2411552 A | 8/2005 |
| JP | 2001-125722 A | 5/2001 |
| KR | 2011-0067849 A | 6/2011 |
| WO | 2001/064070 A1 | 9/2001 |
| WO | 2011/029098 A2 | 3/2011 |
| WO | 2012/108668 A2 | 8/2012 |
| WO | WO 2013/097895 A | 7/2013 |
| WO | 2014/202490 A1 | 12/2014 |
| WO | 2014/204490 A1 | 12/2014 |
| WO | 2015/063361 A1 | 5/2015 |
| WO | 2015/063362 A1 | 5/2015 |

OTHER PUBLICATIONS

"MIT Media Lab: Siftables", Youtube, Retrieved on May 25, 2017, Webpage available at : http://www.youtube.com/watch?v=vbwzBBHtNGI.

"Toy Tiles That Talk to Each Other", TED, Retrieved on May 25, 2017, Webpage available at : https://www.ted.com/talks/david_merrill_demos_siftables_the_smart_blocks.

McNerny, "Tangible Programming Bricks: An Approach to Making Programming Accessible to Everyone", Thesis, Feb. 2000, pp. 1-86.

Dang Trung Kien, "A Review of 3D Reconstruction from Video Sequences", ISIS Technical Report Series, Draft version 0.1, 2005, 35 pages.

Ma et al., "An Invitation to 3-D Vision: From Images to Geometric Models", Interdisciplinary Applied Mathematics, vol. 26, 2003, 542 Pages.

International Search Report and Written Opinion received for corresponding Patent Cooperation Treaty Application No. PCT/FI2013/051014, dated Jul. 31, 2014, 13 pages.

"Leaked Footage: Nokia's Facet Smartwatch Concept", YouTube, Retrieved on May 26, 2017, Webpage available at : https://www.youtube.com/watch?v=Bxn_N4vHqXQ.

International Search Report and Written Opinion received for corresponding Patent Cooperation Treaty Application No. PCT/FI2013/051017, dated Aug. 28, 2014, 14 pages.

Olberding et al., "Argumented Forearm: Exploring the Design Space of a Display-Enhanced Forearm", Proceedings of the 4th Augmented Human International Conference, 2013, pp. 9-12.

"EmoPulse Smile, Best Smartwatch So Far", YouTube, Retrieved on May 26, 2017, Webpage available at : https://www.youtube.com/watch?v=LzPorAgInco.

Office action received for corresponding European Patent Application No. 13795277.6, dated May 11, 2017, 8 pages.

Office action received for corresponding European Patent Application No. 13795278.4, dated May 17, 2017, 10 pages.

Office action received for corresponding European Patent Application No. 13798364.9, dated May 17, 2017, 8 pages.

Non-Final Office action received for corresponding U.S. Appl. No. 15/030748, dated Jun. 14, 2017, 15 pages.

"Touch Screen Bracelet Tells You Weather and Reads Texys", PFSK, Retrieved on Jun. 22, 2017, Webpage available at : https://www.psfk.com/2012/03/touch-screen-bracelet-text.html.

Final Office Action action received for corresponding U.S. Appl. No. 15/030,457, dated Jan. 10, 2018, 16 pages.

Non-Final Office action received for corresponding U.S. Appl. No. 15/030,748, dated Dec. 1, 2017, 11 pages.

International Search Report and Written Opinion received for corresponding Patent Cooperation Treaty Application No. PCT/FI2013/051016, dated Jul. 31, 2014, 14 pages.

Kent Lyons et al. "Facet: A Multi-Segment Wrist Worn System", UIST'12, Proceedings of the Annual ACM Symposium on User Interface Software and Technology, Cambridge, Massachusetts, USA, Oct. 7, 2012, pp. 123-129.

(56) References Cited

OTHER PUBLICATIONS

Non-Final Office action received for corresponding U.S. Appl. No. 14/895,200, dated Apr. 24, 2017, 18 pages.
International Search Report and Written Opinion received for corresponding Patent Cooperation Treaty Application No. PCT/US2013/047143, dated Mar. 25, 2014, 10 pages.
Notice of Allowance received for corresponding U.S. Appl. No. 14/895,200, dated Oct. 5, 2017, 14 pages.
Non-Final Office action received for corresponding U.S. Appl. No. 15/030,457, dated Sep. 14, 2017, 14 pages.
Summons to attend oral proceedings pursuant to Rule 115(1) EPC for European Application No. 13 795 277.6 dated Mar. 26, 2018, 11 pages.
Summons to attend oral proceedings pursuant to Rule 115(1) EPC for European Application No. 13 795 278.4 dated Feb. 20, 2018, 12 pages.
Summons to attend oral proceedings pursuant to Rule 115(1) EPC for European Application No. 13 798 364.9 dated Apr. 5, 2018, 11 pages.
Notice of Allowance for U.S. Appl. No. 15/030,748 dated Aug. 13, 2018.
Office action received for corresponding Chinese Patent Application No. 201380080571.4, dated Apr. 2, 2018, 8 pages of office action and no page of Translation available.
Office action received for corresponding Chinese Patent Application No. 201380080572.9, dated Apr. 18, 2018, 8 pages of office action and no page of Translation available.
Office Action for Chinese Application No. 201380080571.4 dated Nov. 1, 2018, with English Translation, 13 pages.
Office Action for Chinese Application No. 201380080572.9 dated Nov. 20, 2018, with English Summary 7 pages.
Office Action for European Application No. 13 795 278.4 dated Sep. 12, 2018, 4 pages.
Office Action for European Application No. 13 734 598.9 dated Sep. 19, 2018, 5 pages.
Office Action for European Application No. 13795277.6 dated Nov. 22, 2018, 2 pages.
Office Action for European Application No. 13795277.6 dated Jan. 2, 2019, 7 pages.
Office Action for European Application No. 13795277.6 dated Jan. 4, 2019, 14 pages.
Office Action for Chinese Application No. 201380080572.9 dated Mar. 1, 2019, with English Summary 6 pages.

* cited by examiner

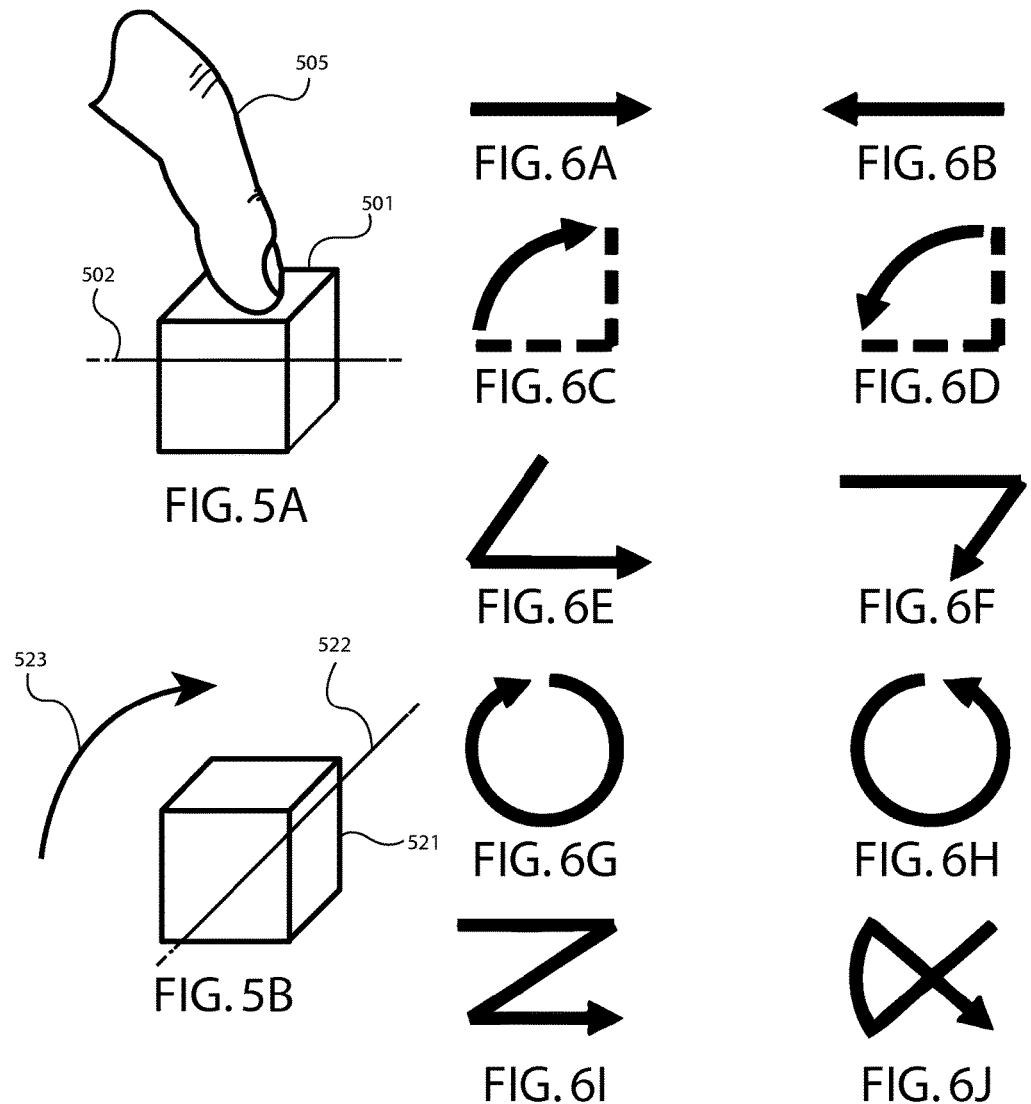

ASSOCIATION BETWEEN A CONTENT ITEM DISPLAYED ON A BEAD DISPLAY APPARATUS AND A TAG

RELATED APPLICATION

This application was originally filed as PCT Application No. PCT/FI2013/051016 filed Oct. 28, 2013.

TECHNICAL FIELD

The present application relates generally to causing establishment of an association between a content item and a tag.

BACKGROUND

Electronic apparatuses are becoming increasing prevalent. Users are increasingly utilizing electronic apparatuses in conjunction with one or more additional apparatuses. It may be desirable to allow for convenient and natural interactions with user electronic apparatuses.

SUMMARY

Various aspects of examples of the invention are set out in the claims.

One or more embodiments may provide an apparatus, a computer readable medium, a non-transitory computer readable medium, a computer program product, and a method for receiving information associated with a first content item, designating a first bead apparatus to be associated with the first content item, the first content item being identified by a first content item identifier, causing display of a visual representation of the first content item identifier by the first bead apparatus on a display of the first bead apparatus, receiving information indicative of a content item selection input of the first bead apparatus indicative of selection of the first content item, receiving input indicative of a tag selection input that identifies a tag, and causing an establishment of an association between the first content item and the tag based, at least in part, on the tag selection input.

One or more embodiments may provide an apparatus, a computer readable medium, a computer program product, and a non-transitory computer readable medium having means for receiving information associated with a first content item, means for designating a first bead apparatus to be associated with the first content item, the first content item being identified by a first content item identifier, means for causing display of a visual representation of the first content item identifier by the first bead apparatus on a display of the first bead apparatus, means for receiving information indicative of a content item selection input of the first bead apparatus indicative of selection of the first content item, means for receiving input indicative of a tag selection input that identifies a tag, and means for causing an establishment of an association between the first content item and the tag based, at least in part, on the tag selection input.

In at least one example embodiment, the display of the first bead apparatus faces an outward facing direction.

In at least one example embodiment, the apparatus is the first bead apparatus.

One or more example embodiments further perform receipt of information associated with a second content item, designation of a second bead apparatus to be associated with the second content item, the second content item being identified by a second content item identifier, and causation of display of a visual representation of the second content item identifier by the second bead apparatus.

One or more example embodiments further perform causation of the establishment of the association between the second content item and the tag based, at least in part, on the tag selection input.

In at least one example embodiment, the second content item is unassociated with the tag, and causation of the establishment of the association between the first content item and the tag fails to cause association between the second content item and the tag.

One or more example embodiments further perform receipt of information associated with a third content item, designation of the second bead apparatus to be associated with the third content item, the third content item being identified by a third content item identifier, causation of termination of display of the visual representation of the second content item identifier by the second bead apparatus, and causation of display of a visual representation of the third content item identifier by the second bead apparatus.

One or more example embodiments further perform designation of the first bead apparatus to be associated with the second content item, the second content item being identified by the second content item identifier, causation of termination of display of the visual representation of the first content item identifier by the first bead apparatus, and causation of display of a visual representation of the second content item identifier by the first bead apparatus.

In at least one example embodiment, receipt of information associated with the first content item is from a camera module.

In at least one example embodiment, receipt of information associated with the first content item is from a separate apparatus.

In at least one example embodiment, receipt of information associated with the first content item is from at least one memory.

One or more example embodiments further perform causation of display of a visual representation of a tag candidate by the first bead apparatus, wherein the tag selection input relates to an input that identifies the tag candidate as the tag.

In at least one example embodiment, the visual representation of the tag candidate relates to a textual representation of the tag candidate.

In at least one example embodiment, the visual representation of the tag candidate relates to a graphical representation of the tag candidate.

In at least one example embodiment, the tag selection input relates to a tap input that corresponds with the representation of the tag candidate.

In at least one example embodiment, causation of display of the visual representation of the tag candidate by the first bead apparatus relates to causation of display of the visual representation of the tag candidate on a different display of the first bead apparatus.

In at least one example embodiment, the display of the first bead apparatus faces a direction, and the content item selection input relates to a rotation input of the first bead apparatus, and the different display relates to a display that becomes facing the direction subsequent to the rotation input, and causation of display of the visual representation of the tag candidate on the different display of the first bead apparatus is based, at least in part, on the rotation input.

In at least one example embodiment, the direction is an outward facing direction.

One or more example embodiments further perform causation of termination of display of the representation of the first content item on the display of the first bead apparatus, wherein causation of display of the visual representation of the tag candidate by the first bead apparatus relates to causation of display of the visual representation of the tag candidate on the display of the first bead apparatus.

In at least one example embodiment, the content item selection input relates to a tap input, and the causation of display of the visual representation of the tag candidate on the display of the first bead apparatus is based, at least in part, on the tap input.

One or more example embodiments further perform receipt of a rotation input of the first bead apparatus, and causation of display of another tag candidate by the first bead apparatus based, at least in part, on the rotation input.

In at least one example embodiment, causation of display of the visual representation of the other tag candidate by the first bead apparatus relates to causation of display of the visual representation of the other tag candidate on a different display of the first bead apparatus.

In at least one example embodiment, the tag candidate and the other tag candidate are comprised by a tag candidate list associated with the first content item.

In at least one example embodiment, the causation of display of, at least one of, the tag candidate or the other tag candidate, is based, at least in part, on the tag candidate and the other tag candidate being adjacent in the tag candidate list.

One or more example embodiments further perform receipt of a tag candidate termination input, and causation of termination of display of the tag candidate by the first bead apparatus based, at least in part, on the tag candidate termination input.

One or more example embodiments further perform causation of display of the representation of the first content item identifier by the first bead apparatus.

One or more example embodiments further perform receipt of input indicative of another tag selection input that identifies another tag, and causation of an establishment of an association between the first content item and the other tag based, at least in part, on the other tag selection input.

One or more example embodiments further perform causation of display of a visual representation of a tag candidate by a tagging bead apparatus, wherein the tag selection input relates to an input that identifies the tag candidate as the tag.

In at least one example embodiment, the tag selection input relates to a tag identification gesture input that correlates to the tag.

One or more example embodiments further perform identification of the tag based, at least in part, on a determination that the tag identification gesture input correlates to the tag.

In at least one example embodiment, the content item selection input relates to a tap input associated with the first bead apparatus.

In at least one example embodiment, the content item selection input relates to a rotation input associated with the first bead apparatus.

In at least one example embodiment, the tag selection input relates to a tap input associated with the first bead apparatus.

In at least one example embodiment, the tag selection input relates to a rotation input associated with the first bead apparatus.

In at least one example embodiment, the content item comprises image content.

In at least one example embodiment, the content item identifier identifying the image content relates to at least one of a location, a position indicator, or metadata associated with the image content.

In at least one example embodiment, the representation of the content item identifier relates to a thumbnail image, a visual representation of the image content, a textual representation of the image content, or a representation of metadata associated with the image content.

In at least one example embodiment, the content item comprises video content.

In at least one example embodiment, the content item identifier identifying the video content relates to at least one of a keyframe, a position indicator, or metadata associated with the video content.

In at least one example embodiment, the representation of the content item identifier relates to a thumbnail image, a visual representation of the video content, a textual representation of the video content, or metadata associated with the video content.

In at least one example embodiment, the content item comprises audio content.

In at least one example embodiment, the content item identifier associated with the audio content relates to at least one of a title, a position indicator, or metadata associated with the audio content.

In at least one example embodiment, the representation of the content item identifier relates to a thumbnail image, an album cover, a visual representation of the audio content, a textual representation of the audio content, or metadata associated with the audio content.

In at least one example embodiment, the content item comprises document content.

In at least one example embodiment, the content item identifier associated with the document content relates to at least one of a title, a subtitle, a position indicator, a bookmark, or metadata associated with the document content.

In at least one example embodiment, the representation of the content item identifier relates to a thumbnail image, a visual representation of the document content, a textual representation of the document content, or metadata associated with the document content.

BRIEF DESCRIPTION OF THE DRAWINGS

For a more complete understanding of embodiments of the invention, reference is now made to the following descriptions taken in connection with the accompanying drawings in which:

FIGS. 5A-5B are diagrams illustrating input associated with a bead apparatus according to at least one example embodiment;

FIGS. 6A-6J are diagrams illustrating a predetermined motion according to at least one example embodiment;

DETAILED DESCRIPTION OF THE DRAWINGS

Figure 1:
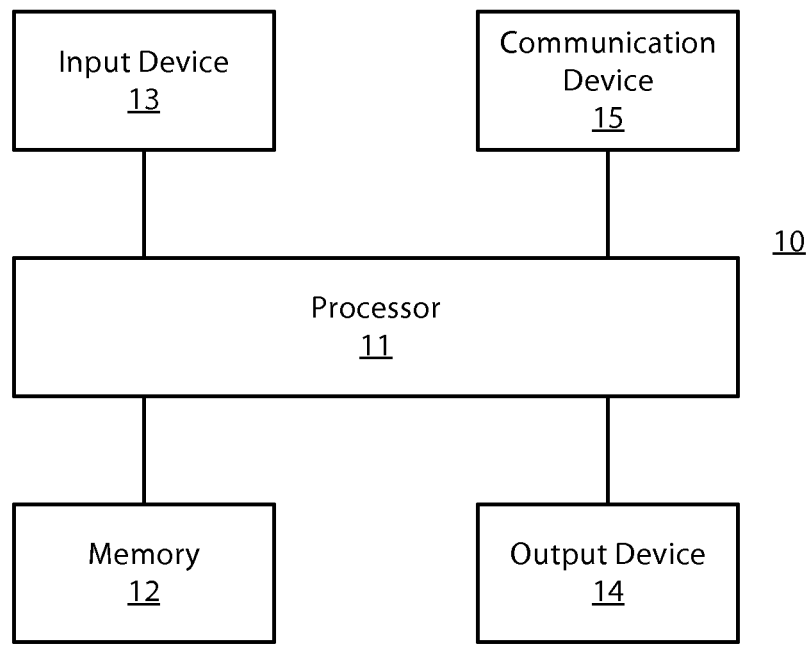
FIG. 1 is a block diagram showing an apparatus according to at least one example embodiment.

An embodiment of the invention and its potential advantages are understood by referring to FIGS. 1 through 18 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
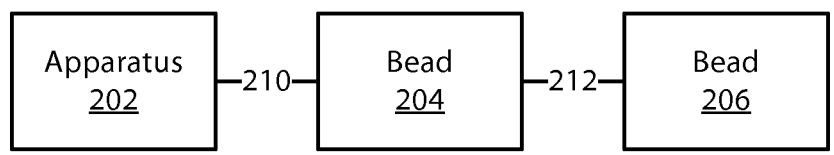
FIGS. 2A-2B are block diagrams showing apparatus communication according to at least one example embodiment.
Figure 2B:
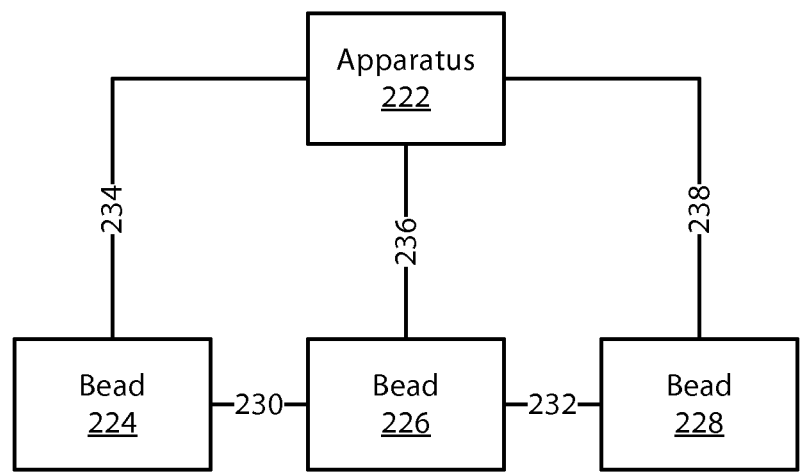

FIGS. 2A-2B are block diagrams showing apparatus communication according to at least one example embodiment. The examples of FIGS. 2A-2B are merely examples and do not limit the scope of the claims. For example, apparatus count may vary, bead apparatus count may vary, communication channels may vary, and/or the like.

As electronic apparatuses becoming increasingly prevalent, users may desire to interact with one or more electronic apparatuses in a convenient manner. For example, a user may desire to interact with their electronic apparatus by way of one or more separate electronic apparatuses. In at least one example embodiment, a separate electronic apparatus is a bead apparatus. The bead apparatus may be similar as described regarding FIGS. 4A-4B.

In some circumstances, a user may desire to utilize two or more bead apparatus in conjunction with each other. In at least one example embodiment, a first bead apparatus and a second bead apparatus communicate directly via a direct communication channel between the first bead apparatus and the second bead apparatus. A direct communication channel may, for example, be a near field communication channel, a wireless local area network communication channel, a Bluetooth communication channel, a wired communication channel, and/or the like. In one or more example embodiments, the first bead apparatus and the second bead apparatus communicate indirectly via an indirect communication channel by way of at least a third bead apparatus. For example, the first bead apparatus may be in direct communication with the intermediate third bead apparatus which, in turn, may be in direct communication with the second bead apparatus. The first bead apparatus may, for example, communicate with the second bead apparatus via the third bead apparatus.

In some circumstances, it may be desirable to centrally manage bead apparatus communication from a control apparatus. For example, the control apparatus may centrally orchestrate bead apparatus operation, communication, and/or the like. The control apparatus may, for example, be a tablet, cellphone, laptop, server, electronic apparatus, and/or the like. In at least one example embodiment, the control apparatus is a bead apparatus. For example, in the case of a first bead apparatus, a second bead apparatus, and a third bead apparatus, the first bead apparatus may manage operations, communications, and/or the like associated with the second bead apparatus and/or the third bead apparatus.

FIG. 2A is a block diagram showing apparatus communication according to at least one example embodiment. In the example of FIG. 2A, apparatus 202 is a control apparatus and each of beads 204 and 206 is a bead apparatus. In the example of FIG. 2A, apparatus 202 is in direct communication with bead 204 via communication channel 210. Bead 204 is in direct communication with bead 206 via communication channel 212. In the example of FIG. 2A, apparatus 202 is in indirect communication with bead 206 via an indirect communication channel by way of bead 204 and communication channels 210 and 212. For example, apparatus 202 may communicate with bead 204 via communication channel 210. Bead 204 may, subsequently, communicate with bead 206 via communication channel 212. Apparatus 202 may cause bead 204 to communicate with bead 206, may cause bead 204 to forward communication to bead 206, and/or the like. Although the example of FIG. 2A illustrates a control apparatus and two bead apparatus, additional bead apparatus may be in communication with apparatus 202, bead 204, and/or bead 206.

FIG. 2B is a block diagram showing apparatus communication according to at least one example embodiment. In the example of FIG. 2B, apparatus 222 is a control apparatus and each of beads 224, 226, and 228 is a bead apparatus. In the example of FIG. 2B, apparatus 222 is in direct communication with bead 224, bead 226, and bead 228 via communication channels 234, 236, and 238, respectively. In the example of FIG. 2B, bead 224 is in direct communication with bead 226 via communication channel 230. Bead 226 is in direct communication with bead 228 via communication channel 232. In the example of FIG. 2B, bead 224 is in indirect communication with bead 228 via an indirect communication channel by way of bead 226 and communication channels 230 and 232. For example, bead 224 may communicate with bead 226 via communication channel 230. Bead 226 may, subsequently, communicate with bead 228 via communication channel 232. Bead 224 may cause bead 226 to communicate with bead 228, may cause bead 226 to forward communication to bead 228, and/or the like. Additionally, each of beads 224, 226, and 228 may be in indirect communication with one another by way of apparatus 222 via communication channels 234, 236, and 238, respectively. Although the example of FIG. 2B illustrates a control apparatus and three bead apparatus, additional bead apparatus may be in communication with apparatus 222, bead 224, bead 226, and/or bead 228.

Figure 3:
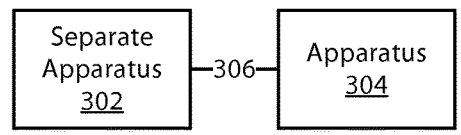
FIG. 3 is a block diagram showing apparatus communication according to at least one example embodiment.

FIG. 3 is a block diagram showing apparatus communication according to at least one example embodiment. The example of FIG. 3 is merely an example and does not limit the scope of the claims. For example, separate apparatus count may vary, apparatus count may vary, communication channels may vary, and/or the like.

In some circumstances, it may be desirable to allow for remote interaction with a bead apparatus. For example, a user may desire his or her bead apparatus to communicate with a separate apparatus. In at least one example embodiment, an apparatus communicates with a separate apparatus. The separate apparatus may, for example, be a server, a database, a computer, a laptop, and/or the like. Such communication may comprise sending of information to the separate apparatus, receiving information from the separate apparatus, and/or the like. In at least one example embodiment, a communication channel between the separate apparatus and the control apparatus is a cellular communication channel, a wireless local area network communication channel, a local area network communication channel, a wide area network communication channel, a Bluetooth communication channel, a near field communication channel, and/or the like. In at least one example embodiment, the separate apparatus communicates with a bead apparatus acting as a control apparatus for one or more additional bead apparatuses.

FIG. 3 is a block diagram showing apparatus communication according to at least one example embodiment. In the example of FIG. 3, separate apparatus 302 is a server, a database, a computer, a laptop, and/or the like. Apparatus 304 may, for example, be a control apparatus, a bead apparatus, and/or the like. In the example of FIG. 3, separate apparatus 302 and apparatus 304 are in communication via communication channel 306. Communication channel 306 may, for example, be a cellular communication channel, a wireless local area network communication channel, a local area network communication channel, a wide area network communication channel, a Bluetooth communication channel, a near field communication channel, and/or the like. Although the example of FIG. 3 illustrates a single separate apparatus and a single apparatus, one or more additional separate apparatus and/or apparatus may be in communication with separate apparatus 302 and/or apparatus 304. In the example of FIG. 3, apparatus 304 may relate to apparatus 202 of FIG. 2A and/or apparatus 222 of FIG. 2B.

Figure 4A:
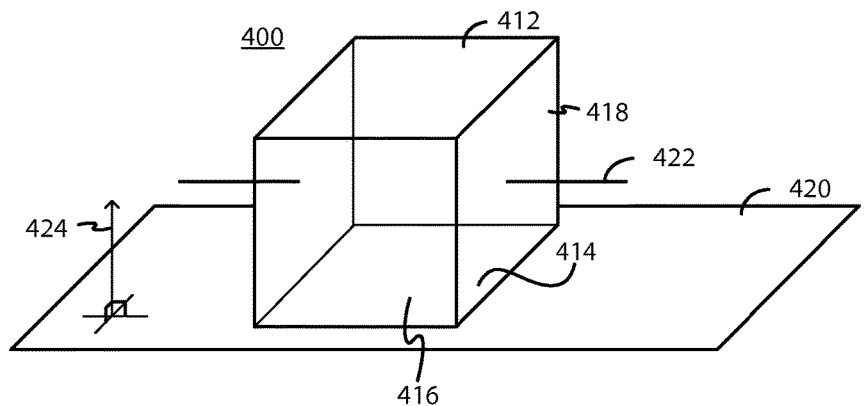
FIGS. 4A-4B are illustrations showing an apparatus according to at least one example embodiment.
Figure 4B:
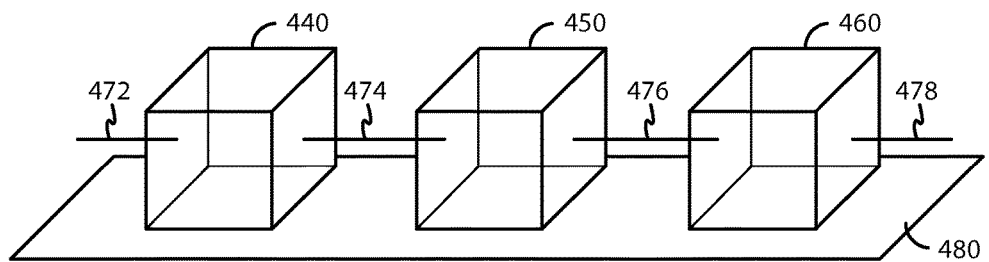

FIGS. 4A-4B are illustrations showing an apparatus according to at least one example embodiment. The examples of FIGS. 4A-4B are merely examples and do not limit the scope of the claims. For example, bead apparatus size, shape, design, and/or count may vary, bead apparatus arrangement may vary, connections between bead apparatuses may vary, and/or the like.

In some circumstances, a user may desire to utilize a bead apparatus as a companion apparatus. For example, a user may desire to use one or more bead apparatus in conjunction with an electronic apparatus, such as a phone, a tablet, and/or the like. In such an example, the user may desire to utilize the bead apparatus as a separate display and/or input device for use in conjunction with their electronic apparatus, for independent use, and/or the like. In at least one example embodiment, a bead apparatus relates to a display apparatus. In one or more example embodiments, a bead apparatus is a cube, a sphere, a rectangular prism, a triangular prism, a cylindrical prism, a trapezoidal prism, and/or the like. In at least one example embodiment, a bead apparatus comprises a display, a display and another display, and/or the like.

FIG. 4A is an illustration showing an apparatus according to at least one example embodiment. In the example of FIG. 4A, bead apparatus 400 is resting on surface 420. Surface 420 may be the nearest surface associated with bead apparatus 400. In the example of FIG. 4A, surface 420 is associated with normal 424. Normal 424 related to a geometric normal associated with the plane of surface 420 and points in a direction perpendicular to surface 420. Bead apparatus 400 comprises sides 412, 414, 416, and 418. In the example of FIG. 4A, side 412 is the side of bead apparatus 400 facing in the direction of geometric normal 424. Side 414 is a side of bead apparatus 400 opposite of side 412. In the example of FIG. 4A, side 414 rests on surface 420. In the example of FIG. 4A, side 416 is a non-axial side of bead apparatus 400 and side 418 is an axial side of bead apparatus 400. Bead apparatus 400 may be configured to rotate about axis 422. In the example of FIG. 4A, axis 422 is centered within side 418 and passes through bead apparatus 400 at an angle perpendicular to side 418. Each of sides 412, 414, 416, and 418 may comprise a display. Although the example of FIG. 4A illustrates a 6-sided cube, bead apparatus 400 may be a sphere, a rectangular prism, a triangular prism, a cylindrical prism, a trapezoidal prism, and/or the like.

Bead apparatus 400 may be rotatable about axis 422. For example, as illustrated, side 412 faces in the direction of normal 424 associated with surface 420. Bead apparatus may be rotated, transitioned, and/or re-oriented about axis 422 such that side 416 faces in the direction of normal 424 associated with surface 420 and side 412 faces in a direction perpendicular to normal 424. In such an example, bead apparatus 400 may determine such a transition in orientation by way of an orientation sensor, an accelerometer, orientation with respect to another bead apparatus, and/or the like.

In some circumstances, it may be desirable to determine an orientation of a bead apparatus. In at least one example embodiment, a bead apparatus may be rotatable along a specific axis. For example, a bead apparatus 400 may comprise a display on side 416 and a display on side 412. In such an example, bead apparatus 400 may be configured to rotate along axis 422. In some circumstances, it may be desirable to modify utilization of a display and another display of a bead apparatus based, at least in part, on rotation of the bead apparatus about an axis of the bead apparatus. In at least one example embodiment, an apparatus determines that a first bead apparatus has transitioned from a first orientation to a second orientation. For example, that bead apparatus 400 has changed orientation. The first orientation may, for example, be an orientation of the bead apparatus such that side 412 faces in a direction of normal 424, and side 416 faces a direction perpendicular to normal 424. The second orientation may, for example, be an orientation of the bead apparatus such that side 416 faces in the direction of normal 424, and side 412 faces the direction perpendicular to normal 424. In at least one example embodiment, the direction is a direction that corresponds with a normal angle to a nearest surface of a user. The nearest surface may, for example, relate to a surface of the user upon which the first bead apparatus is worn. For example, the nearest surface associated with a bead apparatus comprised by a bracelet of bead apparatuses may be the nearest surface of a user's wrist.

The nearest surface associated with a bead apparatus comprised by a necklace of bead apparatuses may be the nearest surface of the user's neck, chest, shoulders, and/or the like. The nearest surface associated with a bead apparatus lying on a table may be the surface of the table. In one or more example embodiments, the determination that a bead apparatus has transitioned from a first orientation to a second orientation occurs absent user input indicative of the transition. For example, the apparatus may determine a transition of orientation based, at least in part, on an orientation sensor, an accelerometer, orientation with respect to another bead apparatus, and/or the like.

In some circumstances, it may be desirable to associate a specific display of a bead apparatus with a specific direction. For example, a specific display of a bead apparatus may be designated as a top display, a side display, an inner display, an outer display, a primary display, and/or the like. In at least one example embodiment, a predetermined direction is a direction that corresponds with a normal angle to a nearest surface of a user. In one or more example embodiments, another predetermine direction is a direction that is perpendicular to the first predetermined direction, an angle that corresponds with a known angle of a display of a bead apparatus, and/or the like. For example, as illustrated in FIG. 4A, side 412 faces the predetermined direction, the direction that corresponds with normal 424, and side 416 faces the other predetermined direction, the direction that is perpendicular to the predetermined direction and perpendicular to normal 424.

In at least one example embodiment, the apparatus may utilize a motion sensor, such as an accelerometer, a gyroscope, etc. to determine rotation of the apparatus. In another example, the apparatus may determine rotation by way of measure movement of the bead apparatus relative to a strand to which the bead apparatus is connected. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

FIG. 4B is an illustration showing an apparatus according to at least one example embodiment. In the example of FIG. 4B, bead apparatus 440 is connected to bead apparatus 450, bead apparatus 450 which is in turn connected to bead apparatus 460. Each of bead apparatuses 440, 450, and 460 is resting on surface 480. In the example of FIG. 4B, surface 480 may be the nearest surface associated with bead apparatuses 440, 450, and 460. In the example of FIG. 4B, bead apparatus 440 is configured to connect to one or more additional bead apparatuses in the direction of axis 472. Bead apparatus 460 is configured to connect to one or more additional bead apparatuses in the direction of axis 478. In the example of FIG. 4B, connections 474 and 476 relate to a chain, a tether, a wire, a communication link, and/or the like running through the rotatable axis of bead apparatus 440, 450, and 460. In the example of FIG. 4B, a length of connection 474 relates to a bead apparatus spacing between bead apparatus 440 and 450. A length of connection 476 relates to a bead apparatus spacing between bead apparatus 450 and 460. Although the example of FIG. 4B illustrates three bead apparatuses connected in a straight line, bead apparatuses 440, 450, and 460 may be associated with one or more additional bead apparatuses and/or bead apparatus to bead apparatus connections. For example, bead apparatus 440 and bead apparatus 460 may be connected, forming a three bead apparatus loop.

In some circumstances, it may be desirable to utilize a plurality of bead apparatuses in conjunction with one another. For example, multiple bead apparatuses may be joined into a chain that may be worn by a user, carried by a user, and/or the like. In at least one example embodiment, multiple bead apparatuses are configured as a bracelet, a necklace, a belt, an earring, and/or the like. In some circumstances, it may be desirable to determine a relative position of a bead apparatus with respect to another bead apparatus, for example, to coordinate use of the two bead apparatuses, to arrange utilization of the two bead apparatuses, and/or the like. In at least one example embodiment, an apparatus determinates a position of a bead apparatus and a position of another bead apparatus. For example, the determination of the position of the bead apparatus and the position of the other bead apparatus may occur absent user input indicative of the position of the bead apparatus and the position of the other bead apparatus, may occur based, at least in part, on user input indicative of the position of the bead apparatus and the position of the other bead apparatus, and/or the like. In the example of FIG. 4B, determination of a position of bead 440 and bead 450 may be based, at least in part, on user input indicating that bead 440 is positioned to the left of bead 450, may be based, at least in part, on bead 440 communicating with bead 450 to determine relative positions, and/or the like. In at least one example embodiment, a position of a bead apparatus relates to a predetermined position of the bead apparatus and the position of another bead apparatus relates to a position relative to the position of the bead apparatus. For example, the predetermined position of the bead apparatus may be a first position, a second position, a last position, a middle position, and/or the like. The position of the other bead apparatus may be a position adjacent to the first bead apparatus, opposite the first bead apparatus, below the first bead apparatus, and/or the like. In the example of FIG. 4B, bead 450 is positioned adjacent and to the right of bead 440.

In some circumstances, it may be desirable to determine positions of multiple bead apparatuses such that an overall arrangement of bead apparatuses may be determined. For example, when using multiple bead apparatuses in conjunction with each other, it may be desirable to utilize a display from each bead apparatus, to utilize the bead apparatus for input, to display sequential information on the bead apparatuses, and/or the like. In at least one example embodiment, an apparatus determines a bead apparatus arrangement. The bead apparatus arrangement may, for example, comprise information indicative of relative position for at least two bead apparatuses. In one or more example embodiment, determination of a bead apparatus arrangement comprises receiving information indicative of a bead apparatus position from at least one bead apparatus, and the bead apparatus arrangement is based, at least in part, on the bead apparatus position of the bead apparatus. For example, in the case of a first bead apparatus operating as a control apparatus, a position of the first bead apparatus may be a predetermined position. The first bead apparatus may, for example, receive information indicative of a position of a second bead apparatus with respect to the position of the first bead apparatus. For example, the first bead apparatus may receive information indicative of the second bead apparatus being positioned adjacent to the first bead apparatus, separated from the first bead apparatus by at least a third bead apparatus, and/or the like. For example, as illustrated in FIG. 4B, bead 440 may receive information from bead 450 indicating that bead 450 is adjacent to bead 440. In another example, bead 440 may receive information from bead 460 indicating that bead 460 is separated from bead 440 by bead 450. In such an example, bead 440 may receive information indicative of the position of bead 460 by way of bead 450 such that bead 440 may determine that bead 450 is positioned adjacent to bead 440 and bead 460 is positioned adjacent to bead 450.

In some circumstances, bead apparatuses may be arranged by a user in a predefined and/or predetermined arrangement. For example, determination of a bead apparatus arrangement may be based, at least in part, on a predetermined bead apparatus arrangement. In one or more example embodiments, a predetermined bead apparatus arrangement comprises information indicative of a predetermined arrangement of a number of bead apparatus. For example, a bead apparatus may be predetermined to be positioned adjacent to another bead apparatus. The other bead apparatus may, for example, be predetermined to be positioned between the bead apparatus and a different bead apparatus. In the example of FIG. 4B, the arrangement of the bead apparatuses such that bead 440 is adjacent to bead 450 and bead 450 is adjacent to 460 may an arrangement indicated by a predetermined bead apparatus arrangement. In at least one example embodiment, a predetermined bead apparatus arrangement comprises information indicative of a predetermined bead apparatus spacing. The predetermined bead apparatus spacing may, for example, relate to a gap between a bead apparatus and another bead apparatus. In some circumstances, it may be desirable to communicate a bead apparatus arrangement to a separate apparatus. For example, a separate apparatus may benefit from information indicative of the bead apparatus arrangement for purposes associated with determining, generating, modifying, communicating, and/or the like information and/or data to multiple bead apparatuses described by the bead apparatus arrangement. In at least one example embodiment, the apparatus sends information indicative of a bead apparatus arrangement of the first bead apparatus and the second bead apparatus to a separate apparatus. The separate apparatus may, for example, relate to a server, a database, a computer, a laptop, and/or the like.

FIGS. 5A-5B are diagrams illustrating input associated with a bead apparatus according to at least one example embodiment. The examples of FIGS. 5A-5B are merely examples and do not limit the scope of the claims. For example, type of input may vary, configuration of the bead apparatus may vary, and/or the like.

In at least one example embodiment, a bead apparatus receives an indication of an input. The bead apparatus may receive the indication of the input from an input device, such as input device 13 of FIG. 1, from a separate apparatus, and/or the like. The indication may relate to information that indicates occurrence of the input, describes at least one characteristic of the input, logistical information associated with the input, and/or the like. For example, the indication of the input may comprise information indicating a direction of the input, a position associated with the input, an input device associated with the input, time information associated with receipt of the input, and/or the like.

FIG. 5A is a diagram illustrating a touch input associated with a bead apparatus according to at least one example embodiment. In at least one example embodiment, the input described by the example of FIG. 5A relates to a tap input. The example of FIG. 5A illustrates bead apparatus 501 mounted on strand 502. In the example of FIG. 5A, finger 505 is performing a touch input on bead apparatus 501. A touch input may relate to an input associated with contact on the surface of the bead apparatus, close proximity to the apparatus, and/or the like. It should be understood that there are many available touch sensors and touch detection methodologies, and that many touch sensor and touch input methodologies will emerge in the future, and that the scope of the claims are not limited in any way by touch sensors and/or touch input methodologies.

In at least one example embodiment, the touch input may be related to a surface of the apparatus. For example, the example of FIG. 5A illustrates a touch input related to the surface of bead apparatus 501 that is currently upward from strand 502. In at least one example embodiment, the indication of the input identifies a surface related to the touch input. For example, the indication of the input may identify the surface based, at least in part, on a relative identification, such as a descriptor relating to the surface in relation to the user, in relation to a surface of the user upon which the bead apparatus is being worn, a surface of the bead apparatus in relation to a strand, and/or the like. In another example, the indication of the input may identify the surface in relation to a non-relative identification. For example, the indication of the input may identify the surface without regard for the interrelationship between the surface and any point of reference unassociated with the bead apparatus.

FIG. 5B is a diagram illustrating an input indicative of rotation associated with a bead apparatus according to at least one example embodiment. In at least one example embodiment, the input described by the example of FIG. 5B relates to a rotation input. In the example of FIG. 5B, force 523 is acting upon bead apparatus 521 to cause rotation of bead apparatus 521. In at least one example embodiment, the rotation relates to rotation around a suspension axis of the bead apparatus, such as around a strand to which the bead apparatus is mounted.

The bead apparatus may determine an input indicative of rotation by way of a sensor, such as a motion sensor, a position sensor, and/or the like. For example, the apparatus may utilize a motion sensor, such as an accelerometer, a gyroscope, etc. to determine rotation of the apparatus. In another example, the apparatus may determine rotation by way of measure movement of the bead apparatus relative to the strand. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

FIGS. 6A-6J are diagrams illustrating a predetermined motion according to at least one example embodiment. The examples of FIGS. 6A-6J are merely examples of predetermined motion, and do not limit the scope of the claims. For example, orientation may vary, pattern may vary, direction may vary, and/or the like. Even though the examples of FIGS. 6A-6J relate to a two-dimensional movement, a predetermined motion may relate to a three dimensional motion.

In at least one example embodiment, a predetermined motion is a motion that an apparatus is capable of identifying. For example, an apparatus may be capable of identifying the predetermined motions of FIGS. 6A-6J. In at least one example embodiment, a predetermined motion relates to a gesture. A gesture may, for example, be performed by a user and may be detectable by an apparatus worn by the user.

An apparatus may determine that a motion, such as a motion performed by a user, correlates to a predetermined motion by evaluating reference motion information. The apparatus may access reference motion information. The reference motion information comprises information for identifying that a motion correlates to a predetermined motion. The reference motion information relating to the plurality of predetermined motions may be accessed by way of a memory, by way of a separate apparatus, and/or the like. Reference motion information may comprise sets of representations that are associated with predetermined motions. The set of representations that is associated with a predetermined motion may be a set of scalar representation, a set of vector representations, a set of purely directional vector representations, and/or the like.

In an example embodiment, the sets of representations associated with the predetermined motions are normalized. Normalization may comprise each set of representations having a common number of representations. The common number may be a predetermined number of representations for each set of representations. Normalization may, for example, relate to each representation of each set of representations having a normalized structure. Normalization may, for example, relate to each set of representations having a common size.

FIG. 6A illustrates an example of a predetermined motion relating to a straight rightward motion. FIG. 6B illustrates an example of a predetermined motion relating to a straight leftward motion. FIG. 6C illustrates an example of a predetermined motion relating to an upward rightward arcing motion. FIG. 6D illustrates an example of a predetermined motion relating to a downward leftward arcing motion. FIG. 6E illustrates an example of a predetermined motion relating to a downward motion followed by a rightward motion. FIG. 6F illustrates an example of a predetermined motion relating to a rightward motion followed by a downward motion.

FIG. 6G illustrates an example of a predetermined motion relating to a clockwise circular motion. FIG. 6H illustrates an example of a predetermined motion relating to a counter-clockwise circular motion. FIG. 6I illustrates an example of a predetermined motion relating to a Z-shaped motion. FIG. 6J illustrates an example of a predetermined motion relating to a crossing motion.

Figure 7A:
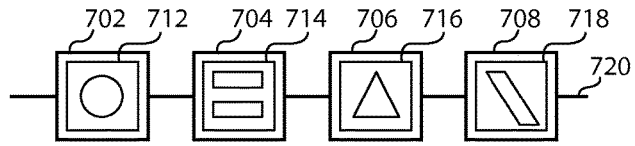
FIGS. 7A-7B are diagrams illustrating apparatus use according to at least one example embodiment.
Figure 7B:
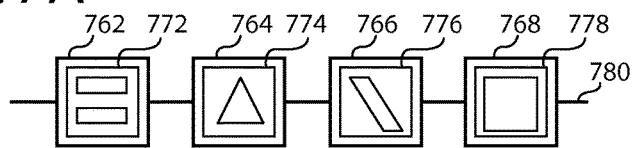

FIGS. 7A-7B are diagrams illustrating apparatus use according to at least one example embodiment. The examples of FIGS. 7A-7B are merely examples and do not limit the scope of the claims. For example, bead apparatus count may vary, configuration of the bead apparatus may vary, representations of the content item identifier may vary, and/or the like.

FIG. 7A is a diagram illustrating apparatus use according to at least one example embodiment. In the example of FIG. 7A, beads 702, 704, 706, and 708 relate to bead apparatus. Beads 702, 704, 706, and 708 are physically connected via strand 720. Representations 712, 714, 716, and 718 each relate to a visual representation of a content item identifier associated with a content item. Each of representations 712, 714, 716, and 718 are associated with a respective content item and content item identifier. In the example of FIG. 7A, representations 712, 714, 716, and 718 may be associated with chronologically adjacent content items, sequentially adjacent content items, and/or the like. In the example of FIG. 7A, representation 712 relates to an image of a circle, representation 714 relates to an image of two parallel lines, representation 716 relates to an image of a triangle, and representation 718 relates to an image of a slanted line.

In some circumstances, it may be desirable to utilize multiple bead apparatuses in conjunction with one another in a way that allows for the collective display of content and/or user interaction with the content. For example, a user may desire to display and/or interact with content by way of multiple displays associated with multiple bead apparatuses. In at least one example embodiment, an apparatus receives information associated with a content item. In one or more example embodiments, the apparatus is a bead apparatus. Receipt of information associated with the content item may, for example, comprise receipt from a camera module. In at least one example embodiment, the camera module is comprised by the apparatus. In one example embodiment, receipt of information associated with the first content item relates to receipt from a separate apparatus. The separate apparatus may, for example, relate to a bead apparatus or a non-bead apparatus, such as a server, an electronic apparatus, a computer, a phone, a tablet, and/or the like. In one or more example embodiments, receipt of information associated with the first content item relates to receipt from at least one memory. In at least one example embodiment, the memory is comprised by the apparatus. In some circumstances, it may be desirable to display and/or interact with more than one content item. For example, a user may desire the ability to view and/or interact with two content items by way of two bead apparatuses. In at least one example embodiment, an apparatus is configured to receive information associated with at least a second content item.

In at least one example embodiment, a content item is identified by way of a content item identifier associated with the content item. A content item identifier may facilitate identification of the content item by the apparatus, facilitate identification of the content item by the user, facilitate location of the content item by the user, and/or the like. In at least one example embodiment, a content item identifier is associated with a visual representation of the content item identifier. The visual representation of the content item identifier may, for example, relate to a representation of the content item identifier used to facilitate identification of the content item by a user of the apparatus. For example, the visual representation of the content item identifier may, for example, relate to a graphical representation, a textual representation, an auditory representation, and/or the like.

In at least one example embodiment, the content item comprises image content. The image content may, for example, relate to a photograph, a digital image, a picture, an animated image, and/or the like. The content item identifier identifying the image content may, for example, relate to a location, metadata associated with the image content, and/or the like. The representation of the content item identifier may, for example, relate to a thumbnail image, a visual representation of the image content, a textual representation of the image content, a representation of metadata associated with the image content, and/or the like.

In at least one example embodiment, the content item comprises video content. The video content may, for example, relate to a movie, a video, an online streaming video, and/or the like. For example, the video content may comprise at least one scene, may be determined to comprise at least one scene, may comprise at least one keyframe, may be determined to comprise at least one keyframe, and/or the like. The content item identifier identifying the video content may, for example, relate to a keyframe, a position indicator, metadata associated with the video content, and/or the like. The representation of the content item identifier may, for example, relate to a thumbnail image, a visual representation of the video content, a textual representation of the video content, a representation of metadata associated with the video content, and/or the like.

In one or more example embodiments, the content item comprises audio content. For example, the audio content may relate to an album, a song, a playlist, and/or the like. The content item identifier associated with the audio content may, for example, relate to a title, a position indicator, metadata associated with the audio content, and/or the like. In such an example, the representation of the content item identifier may relate to a thumbnail image, an album cover, a visual representation of the audio content, a textual representation of the audio content, a representation of metadata associated with the audio content, and/or the like.

In at least one example embodiment, the content item comprises document content. The document content may, for example, relate to a textual message, a memo, a reminder, a book, a chapter, a calendar appointment, and/or the like. The content item identifier associated with the document content may, for example, relate to at least one of a title, a subtitle, a position indicator, a bookmark, metadata associated with the document content, and/or the like. In such an example, the representation of the content item identifier may relate to a thumbnail image, a visual representation of the document content, a textual representation of the document content, a representation of metadata associated with the document content, and/or the like.

In order to facilitate display of and/or interaction with a content item by way of two or more bead apparatuses, it may be desirable to designate and/or allocate at least one content item to a bead apparatus based, at least in part, on a number of bead apparatuses, a bead arrangement, and/or the like. In at least one example embodiment, an apparatus may designate a first bead apparatus to be associated with the first content item. In such an example, the first content item may be identified by a first content item identifier. Similarly, the apparatus may designate a second bead apparatus to be associated with a second content item. In such an example, the second content item may be identified by a second content item identifier. In at least one example embodiment, designation of the first bead apparatus to be associated with the first content item and designation of the second bead apparatus to be associated with the second content item may be based, at least in part, on a spatial relationship between the first bead apparatus and the second bead apparatus.

The spatial relationship may, for example, relate to adjacency of the first bead apparatus and the second bead apparatus, such that no content item that is chronologically and/or sequentially between the first content item and the second content item is associated with another bead apparatus. For example, an apparatus may be associated with at least three content items. In such an example, the first content item may relate to a content item occurring first chronologically and/or first sequentially, the second content item may relate to a content item occurring next chronologically and/or next sequentially, and the third content item may relate to a content item occurring last chronologically and/or last sequentially. As such, the first bead apparatus, directly adjacent to the second bead apparatus, may be designated the first content item and the second bead apparatus may be designated the second content item. Alternatively, in such an example, the first bead apparatus may be designated the second content item and the second bead apparatus may be designated the third content item. In another example, the first bead apparatus may be designated the first content item and the second bead apparatus may be designated the third content item. In such an example, the second content item may be precluded from designation to the first bead apparatus, the second bead apparatus, and/or any additional associated bead apparatuses. In at least one example embodiment, the spatial relationship relates to adjacency of the first bead apparatus and the second bead apparatus, and the first content item may be adjacent to the second content. Such adjacency between the first content item and the second content item may, for example, relate to chronological adjacency, sequential adjacency, and/or the like. For example, two content items may be adjacent in a slideshow, a playlist, a schedule, and/or the like.

In order to facilitate display of and/or interaction with a content items by way of two or more bead apparatuses, it may be desirable to display a content item segment associated with the content item in such that enables quick and easy identification of the content item by a user. In some circumstances, for example, a content item may be identified to the apparatus by a content item identifier that is not conducive to identification and/or recognition by a user of the apparatus. In such an example, it may be desirable to display a representation of the content item identifier such that the representation better facilitates identification of the content item by the user. In at least one example embodiment, a visual representation of the first content item identifier may be caused to be displayed by the first bead apparatus on a display of the first bead apparatus. In at least one example embodiment, the display of the first bead apparatus faces an outward facing direction, similar as described regarding FIGS. 4A-4B. Similarly, a visual representation of the second content item identifier may be caused to be displayed by the second bead apparatus. For example, a content item may relate to video content. In such an example, the video content may be associated with a title, a cover, a collection of metadata, a keyframe, and/or the like. In order to facilitate display of the video content by a bead apparatus, the video content may be associated with a keyframe identifying a specific scene within the video content, a position indicator, a video content identifier identifying a specific scene within the video content, and/or the like. The representation of the content item identifier associated with the video content may, for example, relate to a thumbnail image, a visual representation of the video content, a visual representation of the keyframe, a textual representation of the video content, a representation of the metadata associated with the video content, and/or the like. For example, a bead apparatus associated with a content item may be caused to display a visual representation of a keyframe associated with the content item. For example, the bead apparatus may display a still image associated with the keyframe. For example, bead 702 of FIG. 7A displays representation 712, which is an image of a circle.

In some circumstances, it may be desirable to allow a user to interact with content displayed on one or more bead apparatuses. For example, a user may desire to select a specific content item by way of the associated bead apparatus, and, subsequently, manipulate, edit, modify, transmit, and/or display information associated with the selected content item, as may be described regarding FIGS. 8A-8D. In at least one example embodiment, an apparatus receives information indicative of a content item selection input of a bead apparatus indicative of selection of an associated content item. The content item selection input may, for example, relate to a tap input associated with the bead apparatus. In another example, the content item selection input may relate to a rotation input associated with the bead apparatus.

In some circumstances, it may be desirable to allow for re-designation of a bead apparatus. For example, it may be desirable for a bead apparatus to display a visual representation associated with a content item and, subsequently display a different visual representation associated with a different content item. For example, a display of a bead apparatus may be caused to be updated such that the displayed visual representation correlates with a chronologically current content item based, at least in part, on a chronological display of a stream of information indicative of one or more content items associated with the bead apparatus. In at least one example embodiment, an apparatus receives information associated with a third content item. In such an example, the apparatus may designate a second bead apparatus to be associated with the third content item. The third content item may, for example, be identified by a third content item identifier. For example, FIG. 7A depicts a series of bead apparatus prior to receipt and display of representation 778 by bead 768 in FIG. 7B, bead 768 of FIG. 7B corresponding to bead 708 of FIG. 7A. In the example of FIG. 7A, bead 708 displays representation 718. In the example of FIG. 7B, the corresponding bead apparatus, bead 768, displays representation 778. In such an example, bead 778 terminated display of representation 718 and was caused to display representation 778. In at least one example embodiment, a first bead apparatus may be caused to display a visual representation of a first content item identifier and a second bead apparatus may be caused to display a visual representation of a second content item identifier. In such an example embodiment, the apparatus may cause termination of display of the visual representation of the second content item identifier by the second bead apparatus and subsequently cause display of the visual representation of the third content item identifier. Similarly, in at least one example embodiment, an apparatus may designate the first bead apparatus to be associated with the second content item, identified by the second content item identifier.

In such an example, the apparatus may cause termination of display of the visual representation of the first content item identifier by the first bead apparatus and, subsequently, cause display of the visual representation of the second content item identifier by the first bead apparatus. In effect, and without limitation, the display of the two visual representations associated with the two content items are caused to be shifted to adjacent bead apparatuses. For example, as illustrated in FIG. 7A and FIG. 7B, representations 714, 716, and 718 of FIG. 7A are shifted over one bead apparatus and displayed as corresponding representations 772, 774, and 776, respectively, once representation 778 is caused to be displayed on bead 768.

FIG. 7B is a diagram illustrating apparatus use according to at least one example embodiment. The example of FIG. 7B relates to the example of FIG. 7A, subsequent to receipt and display of a content item associated with representation 778. In the example of FIG. 7B, beads 762, 764, 766, and 768 relate to bead apparatus. Beads 762, 764, 766, and 768 are physically connected via strand 780. Representations 772, 774, 776, and 778 each relate to a visual representation of a content item identifier associated with a content item. Each of representations 772, 774, 776, and 778 are associated with a respective content item and content item identifier. In the example of FIG. 7B, representations 772, 774, 776, and 778 may be associated with chronologically adjacent content items, sequentially adjacent content items, and/or the like. In the example of FIG. 7B, representation 772 relates to an image of two parallel lines, representation 774 relates to an image of a triangle, representation 776 relates to an image of a slanted line, and representation 778 relates to an image of a square. In the example of FIG. 7B, representation 772 corresponds with representation 714 of FIG. 7A, representation 774 corresponds with representation 716 of FIG. 7A, and representation 776 corresponds with representation 718 of FIG. 7A. The example of FIG. 7B may, for example, relate to a shift in display of representations 772, 774, and 776 based, at least in part, on display of representation 778 by bead 768.

FIGS. 8A-8D are diagrams illustrating tag interaction according to at least one example embodiment. The examples of FIGS. 8A-8D are merely examples and do not limit the scope of the claims. For example, bead apparatus count may vary, configuration of the bead apparatus may vary, representations may vary, and/or the like.

In order to identify and/or categorize content items, a user may desire the ability to tag content items in an easy and efficient manner. For example, a user may desire to associate a photo of a beach with a tag associated with a vacation categorization. To facilitate such tagging of content items, it may be beneficial for an apparatus to allow for unambiguous and efficient tagging of content items. In at least one example embodiment, an apparatus causes display of a visual representation of a tag candidate by a bead apparatus. The visual representation of the tag candidate may, for example, relate to a textual representation of the tag candidate, a graphical representation of the tag candidate, and/or the like. In at least one example embodiment, a tag candidate relates to a tag available for association with a content item. For example, a tag candidate may relate to a tag available for association with a content item subsequent to causation of establishing an association between the tag candidate and the content item. In at least one example embodiment, a tag relates to a tag candidate after establishment of association with a content item.

In some circumstances, a user may desire the ability to view a content item and an associated tag simultaneously on a single bead apparatus, on multiple bead apparatuses, and/or the like. In at least one example embodiment, causation of display of the visual representation of the tag candidate by a bead apparatus relates to causation of display of the visual representation of the tag candidate on a display different from a display associated with a visual representation of the associated content item. For example, a first display of a bead apparatus may face a direction. In such an example, a content item selection input may relate to a rotation input of the bead apparatus. A different display may, for example, relate to a second display that becomes facing the direction subsequent to the rotation input. In such an example, causation of display of the visual representation of the tag candidate on the second display of the bead apparatus may be based, at least in part, on the rotation input. For example, causation of display of the visual representation of the tag candidate on the second display of the bead apparatus may be caused by the rotation input. In at least one example embodiment, the direction relates to an outward facing direction.

In some circumstances, a user may desire to select a content item and be presented with a tagging interface on the same display of a bead apparatus. For example, a display of a bead apparatus may display an image of a dog associated with a content item. In such an example, a user may desire to tag the content item associated with the visual representation of the dog as relating to a pet. The user may, for example, select the content item by way of a tap input associated with the bead apparatus displaying the visual representation of the dog and be presented with a visual representation of an associated tag candidate. In at least one example embodiment, an apparatus causes termination of display of a representation of a content item on a display of a bead apparatus and, subsequently, cause display of a visual representation of a tag candidate on the display of the bead apparatus. In one or more example embodiments, a content item selection input relates to a tap input. In such an example, causation of display of the visual representation of the tag candidate on the display of the first bead apparatus may be based, at least in part, on the tap input. For example, causation of display of the visual representation of the tag candidate on the display of the first bead apparatus may be caused by the tap input.

In some circumstances, more than one tag candidate may be associated with a content item. For example, the aforementioned image of a dog may be associated with a tag candidate associated with pets, a tag candidate associated with canines, a tag candidate associated with hunting, a tag candidate associated with vacations, and/or the like. A user may, for example, desire the ability to scroll through the two or more tag candidates. In at least one example embodiment, an apparatus receives a rotation input associated with a bead apparatus. In such an example embodiment, the apparatus may cause display of another tag candidate by the bead apparatus based, at least in part, on the rotation input. For example, the rotation input may cause display of another tag candidate by the bead apparatus. In at least one example embodiment, display of the visual representation of the other tag candidate by the bead apparatus relates to display of the visual representation of the other tag candidate on a different display of the first bead apparatus. The different display may, for example, relate to a display that is different from the display associated with the visual representation of the content item identifier, different from the display associated with the visual representation of the tag candidate, and/or the like. In at least one example embodiment, the tag candidate and the other tag candidate may be comprised by a tag candidate list associated with a content item. The causation of display of the tag candidate or the other tag candidate may be based, at least in part, on the tag candidate and the other tag candidate being adjacent in the tag candidate list. For example, the tag candidate and the other tag candidate may be sequentially adjacent in the tag candidate list. In at least one example embodiment, the tag candidate and the other tag candidate are displayed sequentially, in accordance with the tag candidate list. The tag candidate list may be similar as described regarding FIG. 11.

In order to identify and/or categorize content items, a user may desire the ability to select a tag candidate for association with a content item. For example, a user may desire the ability to select a tag candidate by way of a bead apparatus such that the tag candidate is identified as a tag associated with the content item. In at least one example embodiment, an apparatus receives input indicative of a tag selection input that identifies a tag. The tag selection input may, for example, relate to an input that identifies the tag candidate as a tag for association with a content item. For example, the tag selection input may cause establishment of an association between the tag candidate and the content item such that the content item becomes associated with the tag. In at least one example embodiment, the tag selection input relates to a tap input that corresponds with the representation of the tag candidate, the tag selection input relates to a tap input associated with the bead apparatus, the tag selection input relates to a rotation input associated with the bead apparatus, and/or the like. In at least one example embodiment, a tag selection input relates to a tag identification gesture input that correlates to a tag. A tag identification gesture may, for example, relate to predefined movements identified in FIGS. 6A-6J. In at least one example embodiment, a tag is identified based, at least in part, on a determination that a tag identification gesture input correlates to a tag, similar as may be described regarding FIG. 10.

In some circumstances, a user may desire to select a content item and be presented with a tagging interface on a different bead apparatus. For example, a display of a bead apparatus may display an image of a dog associated with a content item. In such an example, a user may desire to tag the content item associated with the visual representation of the dog as relating to a pet. The user may, for example, select the content item by way of a tap input associated with the bead apparatus displaying the visual representation of the dog and be presented with a visual representation of an associated tag candidate by way of the different bead apparatus. In at least one example embodiment, the different bead apparatus relates to a tagging bead apparatus. The tagging bead apparatus may, for example, relate to a bead apparatus associated with display of a tag candidate associated with a different bead apparatus and/or a content item associated with a different bead apparatus. In at least one example embodiment, an apparatus causes display of a visual representation of a tag candidate by a tagging bead apparatus. In such an example, the tag selection input may relate to an input that identifies the tag candidate as the tag by way of the tagging bead apparatus. The tagging bead apparatus may, for example, function and/or interact similarly to a non-tagging-bead bead apparatus displaying a visual representation of a tag candidate. For example, the tagging bead apparatus may display a visual representation of a tag candidate, receive a rotation input, and subsequently display a visual representation of a different tag candidate. Similarly, the tagging bead apparatus may receive indication of a tag selection input and cause establishment of an association between the associated content item and the associated tag. In at least one example embodiment, an apparatus causes establishment of an association between a content item and a tag based, at least in part, on a tag selection input.

In some circumstances, a user may desire to associate more than one content item with a selected tag candidate. For example, the user may desire to associate all displayed content items with a selected tag candidate, a portion of all displayed content items with a selected tag candidate, and/or the like. In at least one example embodiment, the apparatus causes establishment of an association between a second content item and the tag based, at least in part, on the tag selection input. In such an example, the second content item may have been previously unassociated with the tag. Alternatively, a user may desire to associate only a selected content item with a selected tag. In at least one example embodiment, causation of the establishment of the association between a first content item and a tag fails to cause association between a second content item and the tag. For example, a tag selection input may be associated with a single bead apparatus, a single content item, and/or the like, and may preclude causing establishment of an association between the selected tag candidate and any other bead apparatus, other content item, and/or the like.

In some circumstances, a user may desire to associate a single content item with multiple tags by way of selecting multiple tag candidates for association with the content item. In at least one example embodiment, an apparatus receives input indicative of a second tag selection input that identifies a second tag candidate, subsequent to receipt of input indicative of a first tag selection input identifying a first tag candidate. In such an example, the apparatus may cause an establishment of an association between the first content item and the second tag based, at least in part, on the second tag selection input. In at least one example embodiment, a first tag candidate may be selected by way of a first tag identification gesture input and a second tag candidate may be selected by way of a second tag identification gesture input.

In some circumstances, a user may desire to terminate activities associated with tagging of a content item. For example, the user may desire to resume viewing and/or interaction with other content items, may desire to tag a different content item, and/or the like. As such, the user may desire the ability to terminate a current tagging interaction. In at least one example embodiment, an apparatus receives a tag candidate termination input. The apparatus may, for example, cause termination of display of the tag candidate by the first bead apparatus based, at least in part, on the tag candidate termination input. For example, termination of display of the tag candidate by the first bead apparatus may be caused by the tag candidate termination input. The tag candidate termination input may, for example, relate to a touch input associated with a bead apparatus, a predetermined movement, a specific tag identification gesture input associated with a tag candidate termination input, and/or the like. Subsequent to receipt of a tag candidate termination input, a user may desire to resume previous interactions associated with a bead apparatus. In at least one example embodiment, an apparatus causes termination of display of a visual representation of a tag candidate associated with a content item by a bead apparatus and, subsequently, causes display of a representation of the content item identifier by the bead apparatus. Similarly, in the case of a tagging bead apparatus, the tagging bead apparatus may be caused to terminate display of a visual representation of a tag candidate associated with a content item displayed by another bead apparatus and, subsequently, caused to display a representation of a content item identifier previously displayed by the tagging bead apparatus. For example, the tagging bead apparatus may be caused to resume displaying of a representation of a content item identifier that was display prior to the tagging bead apparatus being caused to display a representation of a tag candidate.

Figure 8A:
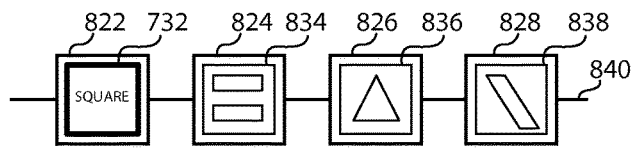
FIGS. 8A-8D are diagrams illustrating tag interaction according to at least one example embodiment.

FIG. 8A is a diagram illustrating tag interaction according to at least one example embodiment. In the example of FIG. 8A, beads 822, 824, 826, and 828 relate to bead apparatuses displaying representations, 732, 834, 836, and 838 respectively. Beads 822, 824, 826, and 828 are physically connected via strand 840. In the example of FIG. 8A, representations 834, 836, and 838 relate to visual representations of a content item identifier. In the example of FIG. 8A, representation 732 relates to a visual representation of a tag candidate. Prior to displaying representation 732, the display of bead 822 corresponded to the display of bead 702 in FIG. 7A. Restated, before bead 822 was caused to display representation 732, bead 802 displayed an image of a circle. In the example of FIG. 8A, bead 822 received a content item selection input and was caused to display a representation of a tag candidate associated with the content item designated to bead 822. In the example of FIG. 8A, selection of the content item by way of the content item selection input is signified by the bolded selection indicator associated with representation 732.

Figure 8B:
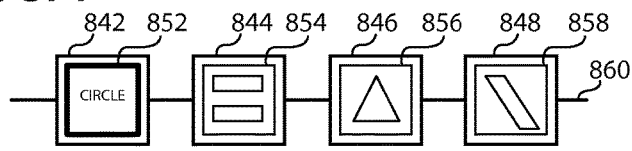

FIG. 8B is a diagram illustrating tag interaction according to at least one example embodiment. The example of FIG. 8B, relates to the example of FIG. 8A subsequent to receipt of a rotational input associated with bead 822 of FIG. 8A. The rotational input may, for example, cause display of a different representation of a different tag candidate on a display of a bead apparatus. In the example of FIG. 8B, beads 842, 844, 846, and 848 relate to bead apparatuses displaying representations 852, 854, 856, and 858, respectively. Beads 842, 844, 846, and 848 are physically connected via strand 860. In the example of FIG. 8B, representations 854, 856, and 858 relate to visual representations of a content item identifier. In the example of FIG. 8B, representation 852 relates to a visual representation of a tag candidate. In at least one example embodiment, representation 852 relates to a tag candidate for associated with a content item designated to bead 842. A user may, for example, perform a tag candidate selection input, a tag identification gesture input, and/or the like, to cause establishment of an association between the tag associated with representation 852 and the content item associated with bead 842.

Figure 8C:
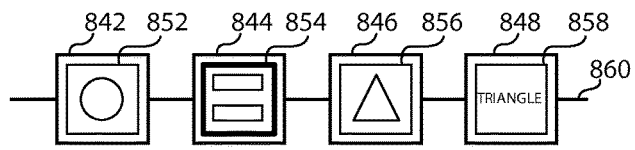

FIG. 8C is a diagram illustrating tag interaction according to at least one example embodiment. In the example of FIG. 8C, beads 842, 844, and 846 relate to bead apparatuses displaying representations 852, 854, and 856, respectively. Bead 848 relates to a tagging bead apparatus displaying representation 858. Beads 842, 844, 846, and 848 are physically connected via strand 860. In the example of FIG. 8C, representations 852, 854, and 856 relate to visual representations of a content item identifier. In the example of FIG. 8C, representation 858 relates to a visual representation of a tag candidate. Prior to displaying representation 858, the display of bead 848 corresponded to the display of bead 708 in FIG. 7A. Restated, before bead 848 was caused to display representation 858, bead 848 displayed an image of a slanted line. In the example of FIG. 8C, bead 844 received a content item selection input. Based, at least in part, on the content item selection input, bead 848 was caused to display a representation of a tag candidate associated with the content item designated to bead 844. In the example of FIG. 8C, selection of the content item by way of the content item selection input is signified by the bolded selection indicator associated with representation 854.

Figure 8D:
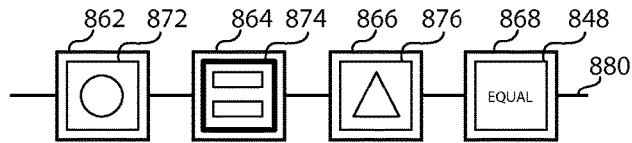

FIG. 8D is a diagram illustrating tag interaction according to at least one example embodiment. The example of FIG. 8D relates to the example of FIG. 8C subsequent to receipt of a rotational input associated with bead 848 of FIG. 8C. The rotational input may, for example, cause display of a different representation of a different tag candidate on a display of bead 848. In the example of FIG. 8D, beads 862, 864, and 866 relate to bead apparatuses displaying representations 872, 874, and 876, respectively. Bead 868 relates to a tagging bead apparatus displaying representation 878. Beads 862, 864, 866, and 868 are physically connected via strand 880. In the example of FIG. 8D, representations 872, 874, and 876 relate to visual representations of a content item identifier. In the example of FIG. 8D, representation 878 relates to a visual representation of a tag candidate. A user may, for example, perform a tag candidate selection input, a tag identification gesture input, and/or the like, to cause establishment of an association between the tag associated with representation 878 and the content item associated with bead 864. For example, representation 874 relates to an image of two parallel lines. Two parallel lines may, for example, relate to an equal sign associated with arithmetic. A user may, for example, desire to cause establishment an association between the content item associated with bead 864 and the tag represented by bead 868.

Figure 9:
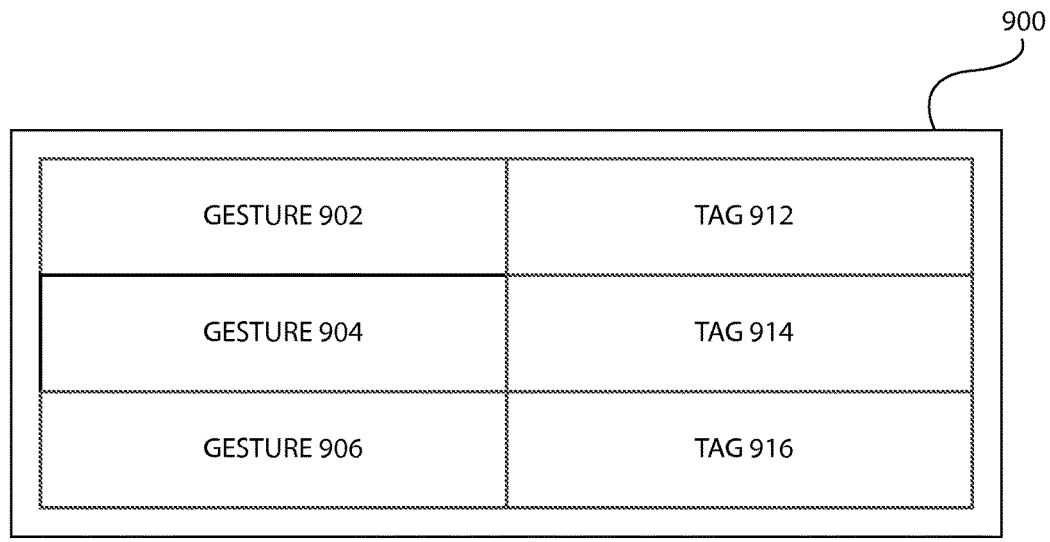
FIG. 9 is a diagram illustrating gesture association according to at least one example embodiment.

FIG. 9 is a diagram illustrating gesture association according to at least one example embodiment. The example of FIG. 9 is merely an example and does not limit the scope of the claims. For example, gesture count may vary, gesture and tag associations may vary, tag count may vary, and/or the like.

In the example of FIG. 9, table 900 relates to a gesture correlation table. In at least one example embodiment, a gesture correlation table relates to a table that correlates a specific tag identification gesture input with a specific tag candidate. For example, the gesture correlation table may correlate a clapping gesture with a tag related to a sporting event. In at least one example embodiment, an apparatus receives information indicative of performance of a tag identification gesture input by a user. In such an example, the apparatus may look up the tag identification gesture input and correlate the tag identification gesture input to a specific tag candidate for establishment of an association with a content item. The gesture correlation table may, for example, relate to a predetermined table, a predefined table, a user-defined table, a user-modifiable table, and/or the like. The gesture correlation table may, for example, be received from at least one memory, a bead apparatus, a separate apparatus, and/or the like. The separate apparatus may, for example, relate to a computer, a server, a laptop, an electronic apparatus, a phone, a tablet, and/or the like. Table 900 comprises gestures 902, 904, and 906. Each of gesture 902, 904, and 906 may relate to a predetermined movement, similar as may be described regarding FIGS. 6A-6J. Gestures 902, 904, and 906 correlate to tags 912, 914, and 916, respectively. In the example of FIG. 9, performance of gesture 902 may cause establishment of an association between a selected content item and tag 912. Similarly, performance of gesture 904 may cause establishment of an association between a selected content item and tag 914, and performance of gesture 906 may cause establishment of an association between a selected content item and tag 916. In at least one example embodiment, an apparatus determines performance of at least one of gestures 902, 904, or 906 by way of a motion sensor, an accelerometer, and/or the like. In the example of FIG. 9, a user may perform one or more of gestures 902, 904, and 906 in order to associate a content item with one or more of tags 912, 914, and 916, respectively.

Figure 10:
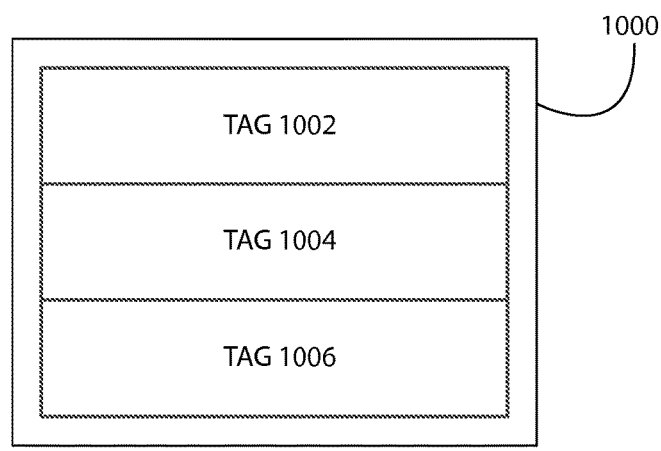
FIG. 10 is a diagram illustrating a tag candidate list according to at least one example embodiment.

FIG. 10 is a diagram illustrating a tag candidate list according to at least one example embodiment. The example of FIG. 10 is merely an example and does not limit the scope of the claims. For example, tag count may vary, variable count may vary, table configuration may vary, and/or the like.

In the example of FIG. 10, table 1000 relates to a tag candidate list. Table 1000 comprises tags 1002, 1004, and 1006. The tag candidate list may, for example, relate to a predetermined list, a predefined list, a user-defined list, a user-modifiable list, a determinable list, a subpart of another list, and/or the like. The tag candidate list may, for example, be received from at least one memory, a bead apparatus, a separate apparatus, and/or the like. The separate apparatus may, for example, relate to a computer, a server, a laptop, an electronic apparatus, a phone, a tablet, and/or the like. In the example of FIG. 10, tag 1002 relates to a tag that is adjacent to tag 1004. Similarly, tag 1004 relates to a tag that is adjacent to tag 1006. In at least one example embodiment, a bead apparatus is caused to display a representation associated with tag 1002. In such an example, a user may desire to select a tag candidate different from the tag candidate currently displayed. The user may, for example, interact with the associated bead apparatus by way of a rotational input. As a result, the bead apparatus may be caused to display a representation of another tag candidate. In such an example, the apparatus may cause display of a representation associated with tag 1004 based, at least in part, on a sequential adjacency between tag 1002 and tag 1004 in the tag candidate list.

Figure 11:
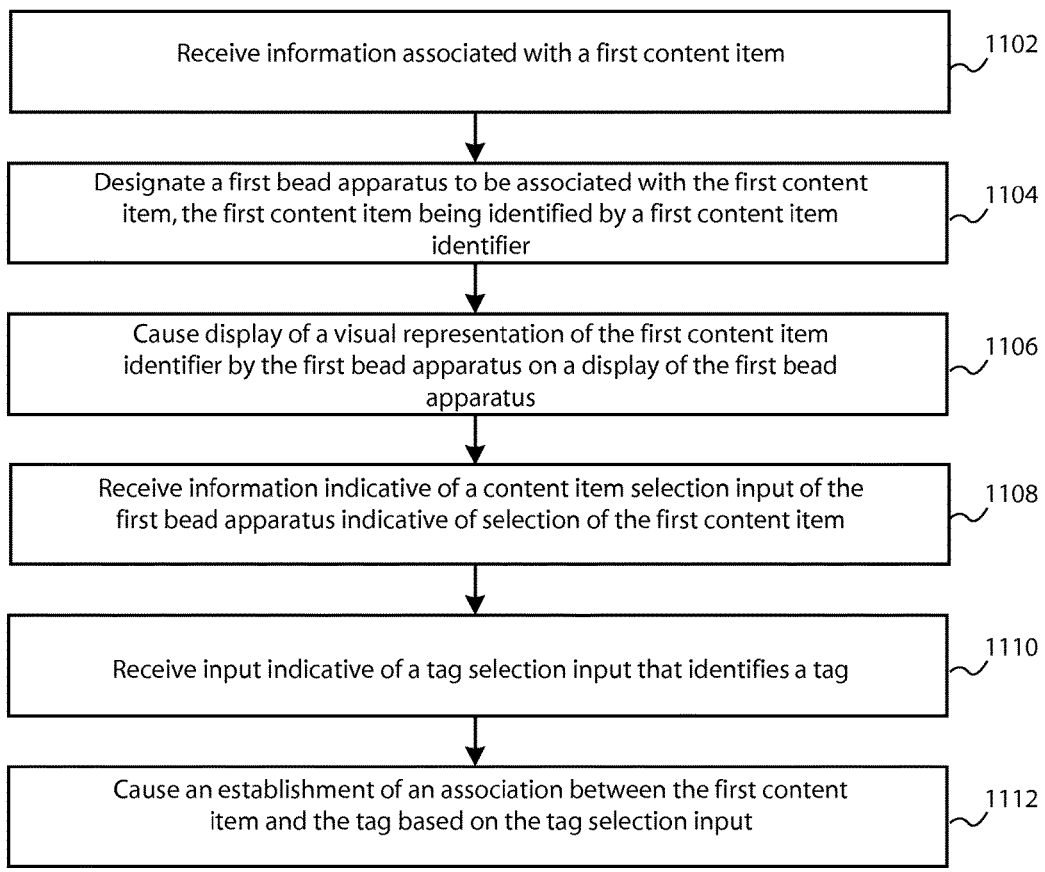
FIG. 11 is a flow diagram illustrating activities associated with causing establishment of an association between a content item and a tag according to at least one example embodiment.

FIG. 11 is a flow diagram illustrating activities associated with causing establishment of an association between a content item and a tag according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus receives information associated with a first content item. The receipt, the information, and the first content item may be similar as described regarding FIG. 2A-2B, FIG. 3, and FIGS. 7A-7B.

At block 1104, the apparatus designates a first bead apparatus to be associated with the first content item that may be identified by a first content item identifier. The designation, the first bead apparatus, the identification, and the first content item identifier may be similar as described regarding FIGS. 4A-4B and FIGS. 7A-7B.

At block 1106, the apparatus causes display of a visual representation of the first content item identifier by the first bead apparatus on a display of the first bead apparatus. The causation of display, the visual representation of the first content item identifier, and the display of the first bead apparatus may be similar as described regarding FIGS. 4A-4B, FIGS. 7A-7B, and FIGS. 8A-8D.

At block 1108, the apparatus receives information indicative of a content item selection input of the first bead apparatus indicative of selection of the first content item. The receipt, the information, the content item selection input, and the indication of selection may be similar as described regarding FIGS. 5A-5D, FIGS. 6A-6J, FIGS. 7A-7B, and FIGS. 8A-8D.

At block 1110, the apparatus receives input indicative of a tag selection input that identifies a tag. The receipt, the indication, the tag selection input, the identification, and the tag may be similar as described regarding FIGS. 5A-5D, FIGS. 6A-6J, FIGS. 7A-7B, and FIGS. 8A-8D.

At block 1112, the apparatus causes an establishment of an association between the first content item and the tag based, at least in part, on the tag selection input. The causation of establishment of the association may be similar as described regarding FIGS. 7A-7B and FIGS. 8A-8D.

Figure 12:
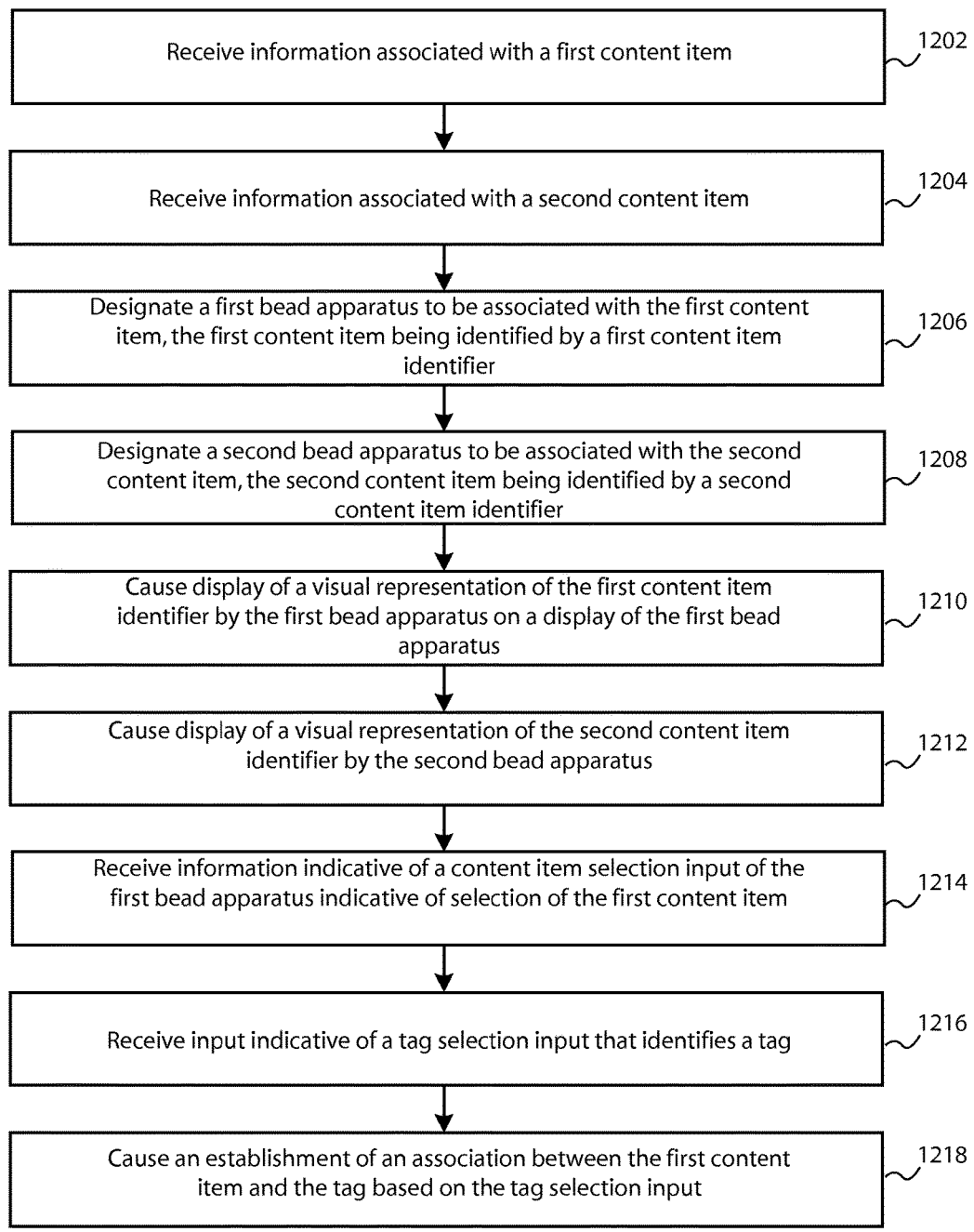
FIG. 12 is a flow diagram illustrating activities associated with causing establishment of an association between a content item and a tag according to at least one example embodiment.

FIG. 12 is a flow diagram illustrating activities associated with causing establishment of an association between a content item and a tag according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus receives information associated with a first content item, similar as described regarding block 1102 of FIG. 11.

At block 1204, the apparatus receives information associated with a second content item. The receipt, the information, and the second content item may be similar as described regarding FIG. 2A-2B, FIG. 3, and FIGS. 7A-7B.

At block 1206, the apparatus designates a first bead apparatus to be associated with the first content item that may be identified by a first content item identifier. The designation, the first bead apparatus, the identification, and the first content item identifier may be similar as described regarding FIGS. 4A-4B and FIGS. 7A-7B.

At block 1208, the apparatus designates a second bead apparatus to be associated with the second content item that may be identified by a second content item identifier. The designation, the second bead apparatus, the identification, and the second content item identifier may be similar as described regarding FIGS. 4A-4B and FIGS. 7A-7B.

At block 1210, the apparatus causes display of a visual representation of the first content item identifier by the first bead apparatus on a display of the first bead apparatus. The causation of display, the visual representation of the first content item identifier, and the display of the first bead apparatus may be similar as described regarding FIGS. 4A-4B, FIGS. 7A-7B, and FIGS. 8A-8D.

At block 1212, the apparatus causes display of a visual representation of the second content item identifier by the second bead apparatus. The causation of display and the visual representation of the second content item identifier may be similar as described regarding FIGS. 4A-4B, FIGS. 7A-7B, and FIGS. 8A-8D.

At block 1214, the apparatus receives information indicative of a content item selection input of the first bead apparatus indicative of selection of the first content item. The receipt of information, the indication, the content item selection input, and the indication of selection may be similar as described regarding FIGS. 5A-5D, FIGS. 6A-6J, FIGS. 7A-7B, and FIGS. 8A-8D.

At block 1216, the apparatus receives input indicative of a tag selection input that identifies a tag. The receipt, the indication, the tag selection input, and the tag may be similar as described regarding FIGS. 5A-5D, FIGS. 6A-6J, FIGS. 7A-7B, and FIGS. 8A-8D.

At block 1218, the apparatus causes an establishment of an association between the first content item and the tag based, at least in part, on the tag selection input. The causation of establishment of the association may be similar as described regarding FIGS. 7A-7B and FIGS. 8A-8D.

Figure 13:
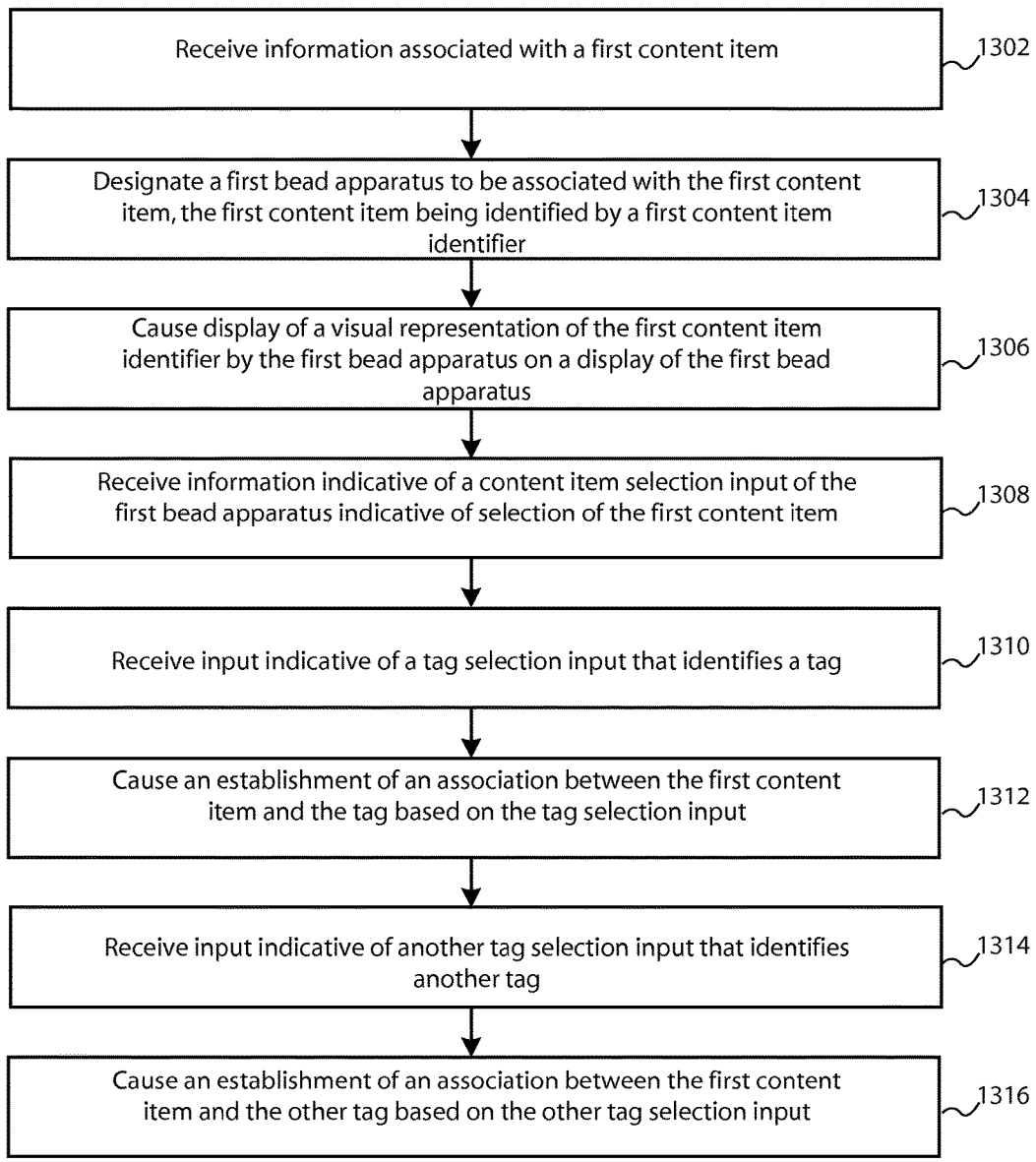
FIG. 13 is a flow diagram illustrating activities associated with causing establishment of an association between a content item and a tag according to at least one example embodiment.

FIG. 13 is a flow diagram illustrating activities associated with causing establishment of an association between a content item and a tag according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus receives information associated with a first content item, similar as described regarding block 1102 of FIG. 11.

At block 1304, the apparatus designates a first bead apparatus to be associated with the first content item that may be identified by a first content item identifier, similar as described regarding block 1104 of FIG. 11.

At block 1306, the apparatus causes display of a visual representation of the first content item identifier by the first bead apparatus on a display of the first bead apparatus, similar as described regarding block 1106 of FIG. 11.

At block 1308, the apparatus receives information indicative of a content item selection input of the first bead apparatus indicative of selection of the first content item, similar as described regarding block 1108 of FIG. 11.

At block 1310, the apparatus receives input indicative of a tag selection input that identifies a tag, similar as described regarding block 1110 of FIG. 11.

At block 1312, the apparatus causes an establishment of an association between the first content item and the tag based, at least in part, on the tag selection input, similar as described regarding block 1112 of FIG. 11.

At block 1314, the apparatus receives input indicative of another tag selection input that identifies another tag. The receipt, the indication, the other tag selection input, and the other tag may be similar as described regarding FIGS. 5A-5D, FIGS. 6A-6J, FIGS. 7A-7B, and FIGS. 8A-8D.

At block 1316, the apparatus causes an establishment of an association between the first content item and the other tag based, at least in part, on the other tag selection input. The causation of establishment of the association may be similar as described regarding FIGS. 7A-7B and FIGS. 8A-8D.

Figure 14:
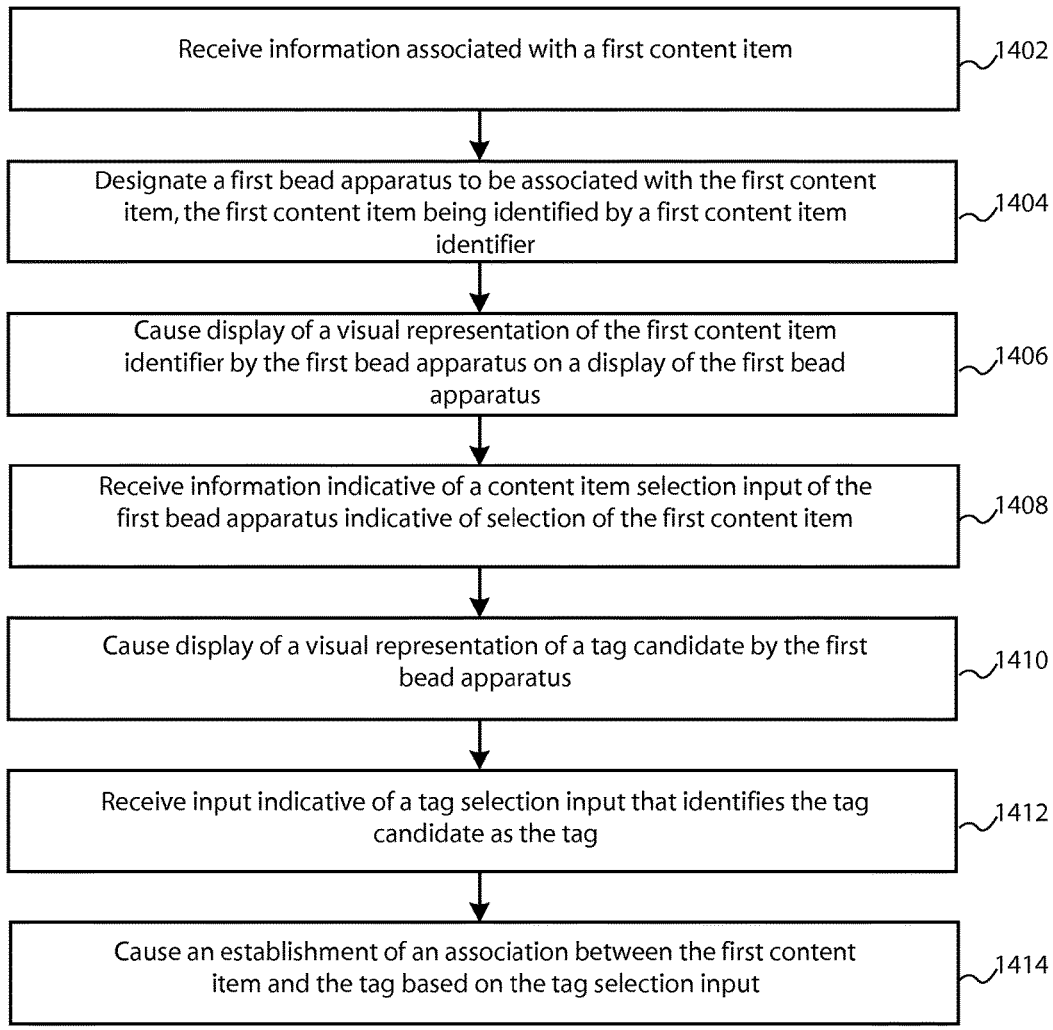
FIG. 14 is a flow diagram illustrating activities associated with causing establishment of an association between a content item and a tag according to at least one example embodiment.

FIG. 14 is a flow diagram illustrating activities associated with causing establishment of an association between a content item and a tag according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus receives information associated with a first content item, similar as described regarding block 1102 of FIG. 11.

At block 1404, the apparatus designates a first bead apparatus to be associated with the first content item that may be identified by a first content item identifier, similar as described regarding block 1104 of FIG. 11.

At block 1406, the apparatus causes display of a visual representation of the first content item identifier by the first bead apparatus on a display of the first bead apparatus, similar as described regarding block 1106 of FIG. 11.

At block 1408, the apparatus receives information indicative of a content item selection input of the first bead apparatus indicative of selection of the first content item, similar as described regarding block 1108 of FIG. 11.

At block 1410, the apparatus causes display of a visual representation of a tag candidate by the first bead apparatus. The causation of display, the visual representation, and the tag candidate may be similar as described regarding FIGS. 7A-7B and FIGS. 8A-8D.

At block 1412, the apparatus receives input indicative of a tag selection input that identifies a tag, similar as described regarding block 1110 of FIG. 11.

At block 1414, the apparatus causes an establishment of an association between the first content item and the tag based, at least in part, on the tag selection input, similar as described regarding block 1112 of FIG. 11.

Figure 15:
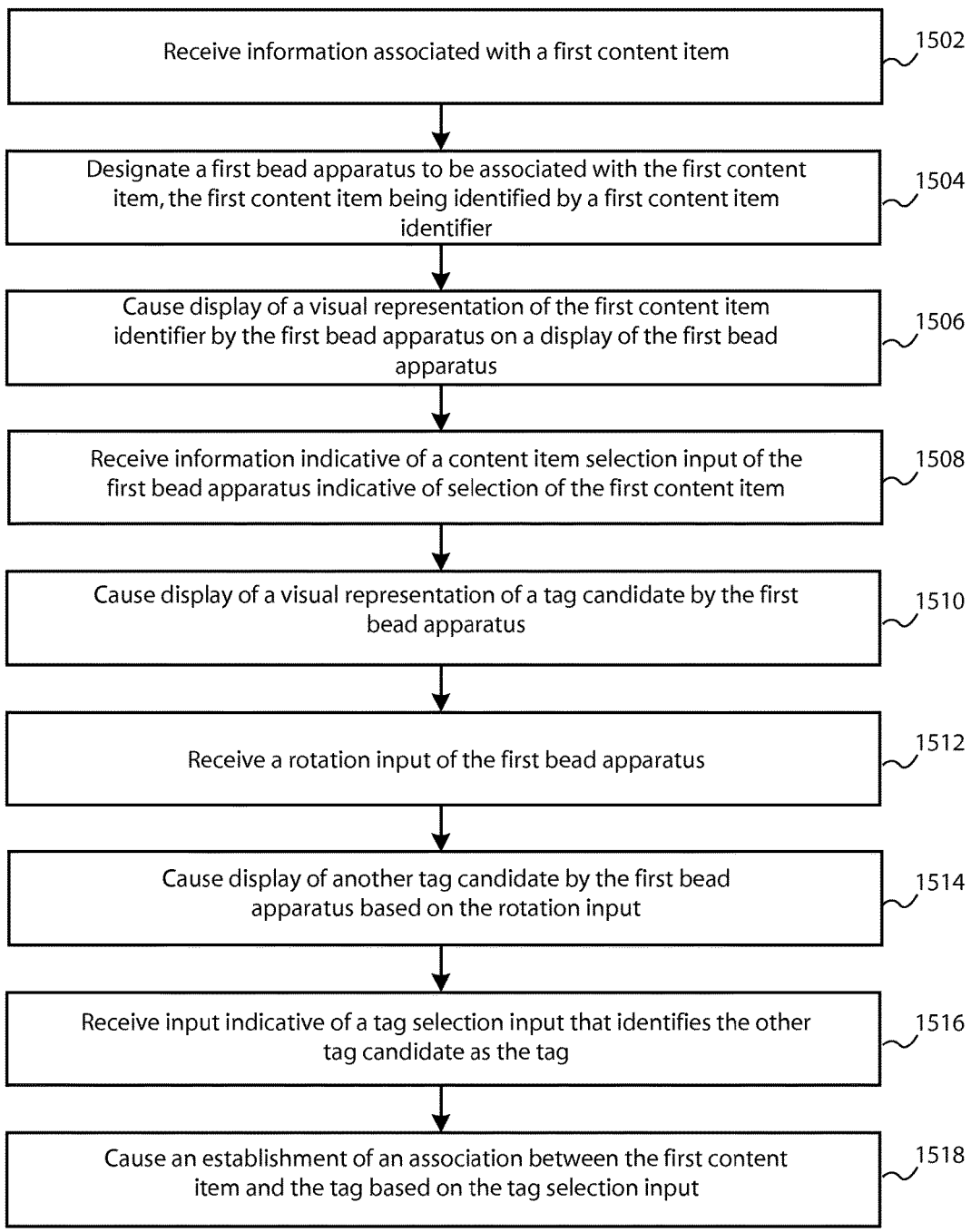
FIG. 15 is a flow diagram illustrating activities associated with causing establishment of an association between a content item and a tag according to at least one example embodiment.

FIG. 15 is a flow diagram illustrating activities associated with causing establishment of an association between a content item and a tag according to at least one example embodiment. In at least one example embodiment, there is a set of operations that corresponds with the activities of FIG. 15. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 15.

At block 1502, the apparatus receives information associated with a first content item, similar as described regarding block 1102 of FIG. 11.

At block 1504, the apparatus designates a first bead apparatus to be associated with the first content item that may be identified by a first content item identifier. The designation, the bead apparatus, the content item, the identification, similar as described regarding block 1104 of FIG. 11.

At block 1506, the apparatus causes display of a visual representation of the first content item identifier by the first bead apparatus on a display of the first bead apparatus, similar as described regarding block 1106 of FIG. 11.

At block 1508, the apparatus receives information indicative of a content item selection input of the first bead apparatus indicative of selection of the first content item, similar as described regarding block 1108 of FIG. 11.

At block 1510, the apparatus causes display of a visual representation of a tag candidate by the first bead apparatus, similar as described regarding block 1410 of FIG. 14.

At block 1512, the apparatus receives a rotation input of the first bead apparatus. The receipt and the rotation input may be similar as described regarding FIG. 4B and FIGS. 8A-8D.

At block 1514, the apparatus causes display of another tag candidate by the first bead apparatus based, at least in part, on the rotation input. The causation of display and the other tag candidate may be similar as described regarding FIGS. 8A-8D.

At block 1516, the apparatus receives input indicative of a tag selection input that identifies the other tag candidate as the tag. The receipt, the indication, the tag selection input, and the identification of the other tag candidate as the tag may be similar as described regarding FIGS. 5A-5D, FIGS. 6A-6J, FIGS. 7A-7B, and FIGS. 8A-8D.

At block 1518, the apparatus causes an establishment of an association between the first content item and the tag based, at least in part, on the tag selection input. The causation of establishment of the association may be similar as described regarding FIGS. 7A-7B and FIGS. 8A-8D.

Figure 16:
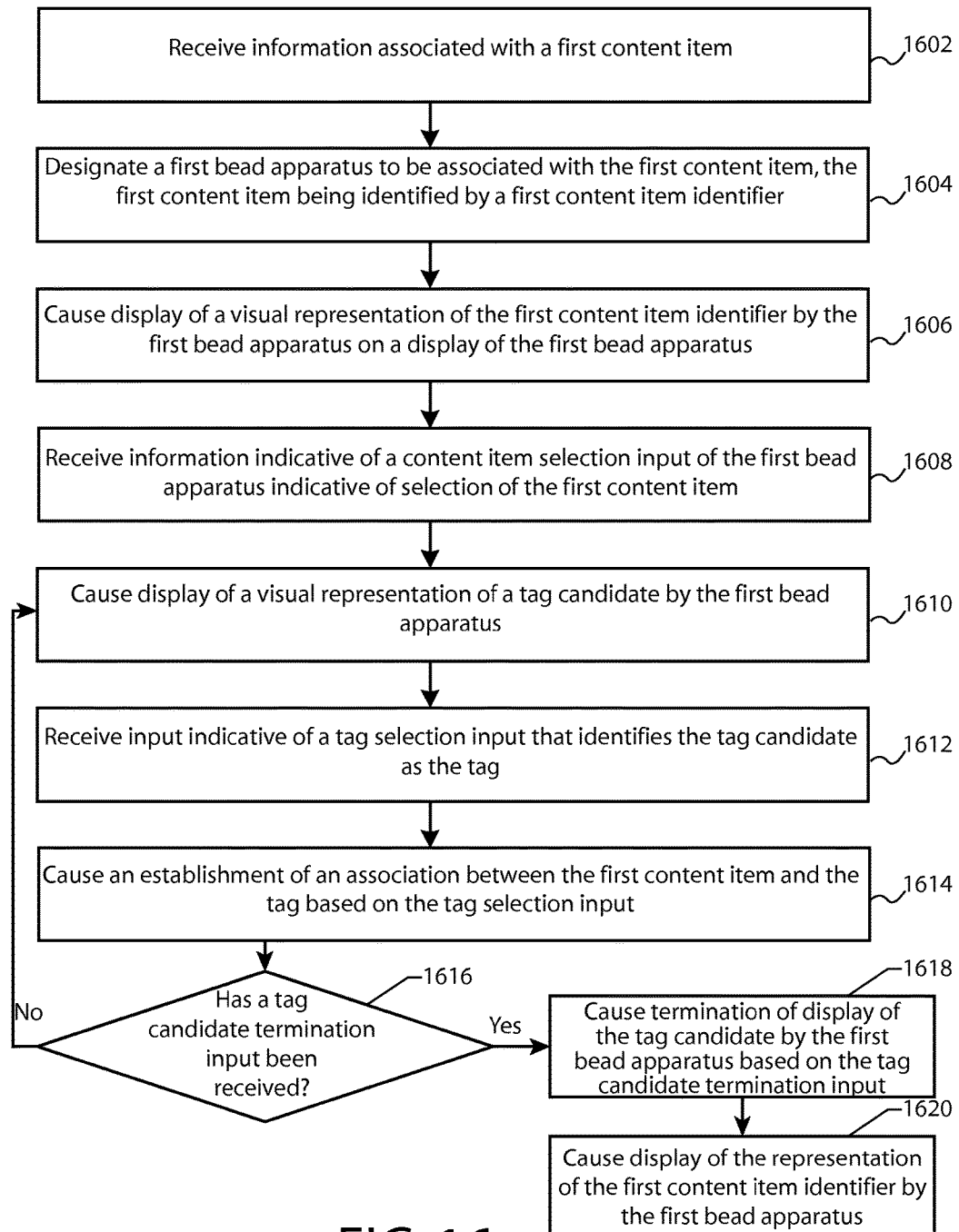
FIG. 16 is a flow diagram illustrating activities associated with causing establishment of an association between a content item and a tag according to at least one example embodiment.

FIG. 16 is a flow diagram illustrating activities associated with causing establishment of an association between a content item and a tag according to at least one example embodiment. In at least one example embodiment, there is a set of operations that corresponds with the activities of FIG. 16. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 16.

At block 1602, the apparatus receives information associated with a first content item, similar as described regarding block 1102 of FIG. 11.

At block 1604, the apparatus designates a first bead apparatus to be associated with the first content item that may be identified by a first content item identifier, similar as described regarding block 1104 of FIG. 11.

At block 1606, the apparatus causes display of a visual representation of the first content item identifier by the first bead apparatus on a display of the first bead apparatus, similar as described regarding block 1106 of FIG. 11.

At block 1608, the apparatus receives information indicative of a content item selection input of the first bead apparatus indicative of selection of the first content item, similar as described regarding block 1108 of FIG. 11.

At block 1610, the apparatus causes display of a visual representation of a tag candidate by the first bead apparatus. The causation of display, the visual representation, and the tag candidate may be similar as described regarding FIGS. 7A-7B and FIGS. 8A-8D.

At block 1612, the apparatus receives input indicative of a tag selection input that identifies a tag. The receipt, the indication, the tag selection input, and the tag may be similar as described regarding FIGS. 5A-5D, FIGS. 6A-6J, FIGS. 7A-7B, and FIGS. 8A-8D.

At block 1614, the apparatus causes an establishment of an association between the first content item and the tag based, at least in part, on the tag selection input. The causation of the establishment of the association may be similar as described regarding FIGS. 7A-7B and FIGS. 8A-8D.

At block 1616, the apparatus determines whether a tag candidate termination input has been received. The determination, the receipt, and the tag candidate termination input may be similar as described regarding FIGS. 5A-5B, FIGS. 6A-6J, and FIGS. 8A-8D. If the apparatus determines that a tag candidate termination input has been received, flow proceeds to block 1618. If the apparatus determines that a tag candidate termination input has failed to have been received, flow returns to block 1610.

At block 1618, the apparatus causes termination of display of the tag candidate by the first bead apparatus based, at least in part, on the tag candidate termination input. The causation of termination of display may be similar as described regarding FIGS. 8A-8D. In this manner, the termination of display of the tag candidate by the first bead apparatus may be based, at least in part, on receipt of the tag candidate termination input.

At block 1620, the apparatus causes display of the visual representation of the first content item identifier by the first bead apparatus. The causation of display may be similar as described regarding FIGS. 4A-4B, FIGS. 7A-7B, and FIGS. 8A-8D.

Figure 17:
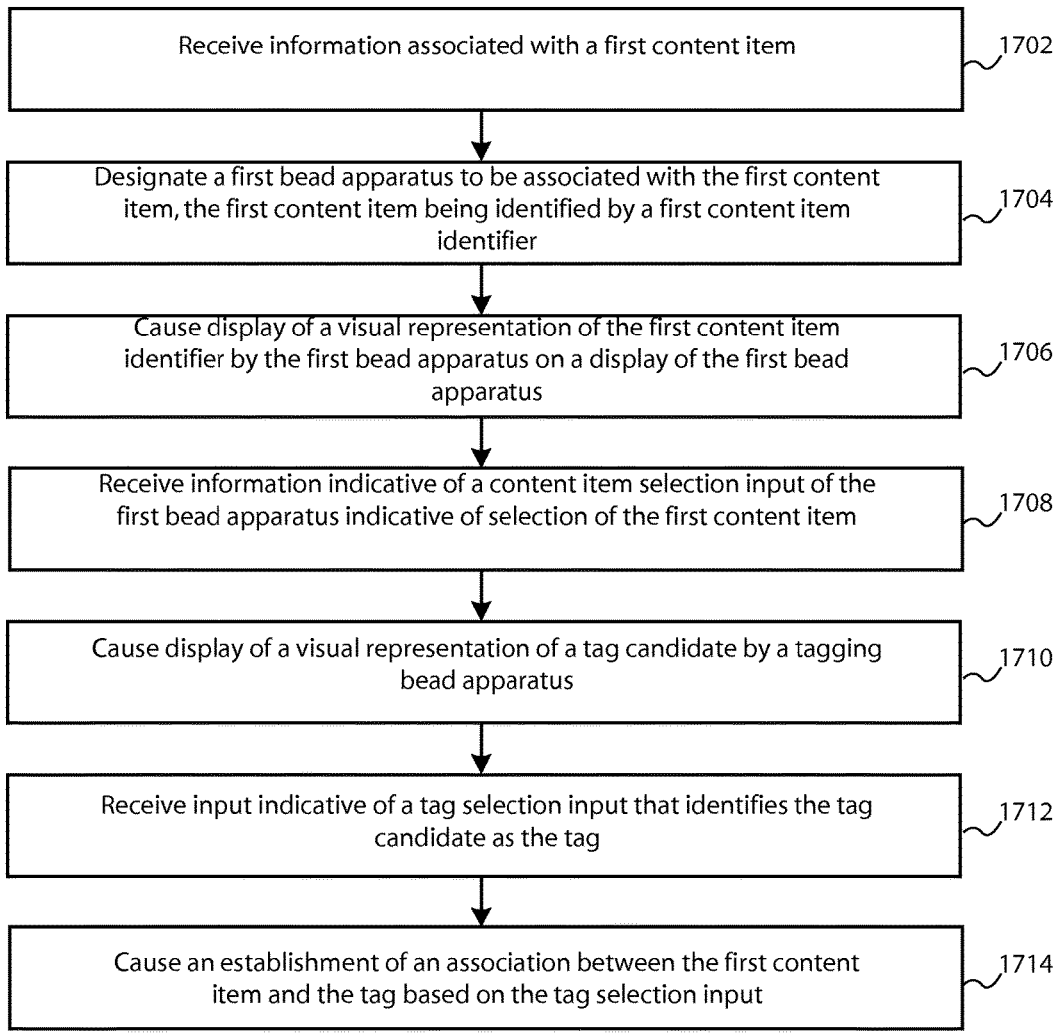
FIG. 17 is a flow diagram illustrating activities associated with causing establishment of an association between a content item and a tag according to at least one example embodiment.

FIG. 17 is a flow diagram illustrating activities associated with causing establishment of an association between a content item and a tag according to at least one example embodiment. In at least one example embodiment, there is a set of operations that corresponds with the activities of FIG. 17. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 17.

At block 1702, the apparatus receives information associated with a first content item, similar as described regarding block 1102 of FIG. 11.

At block 1704, the apparatus designates a first bead apparatus to be associated with the first content item that may be identified by a first content item identifier, similar as described regarding block 1104 of FIG. 11.

At block 1706, the apparatus causes display of a visual representation of the first content item identifier by the first bead apparatus on a display of the first bead apparatus, similar as described regarding block 1106 of FIG. 11.

At block 1708, the apparatus receives information indicative of a content item selection input of the first bead apparatus indicative of selection of the first content item, similar as described regarding block 1108 of FIG. 11.

At block 1710, the apparatus causes display of a visual representation of a tag candidate by a tagging bead apparatus. The causation of display, the visual representation, the tag candidate, and the tagging bead apparatus may be similar as described regarding FIGS. 7A-7B and FIGS. 8A-8D.

At block 1712, the apparatus receives input indicative of a tag selection input that identifies a tag. The receipt, the indication, the tag selection input, and the tag may be similar as described regarding FIGS. 5A-5D, FIGS. 6A-6J, FIGS. 7A-7B, and FIGS. 8A-8D.

At block 1714, the apparatus causes an establishment of an association between the first content item and the tag based, at least in part, on the tag selection input. The causation of establishment of the association may be similar as described regarding FIGS. 7A-7B and FIGS. 8A-8D.

Figure 18:
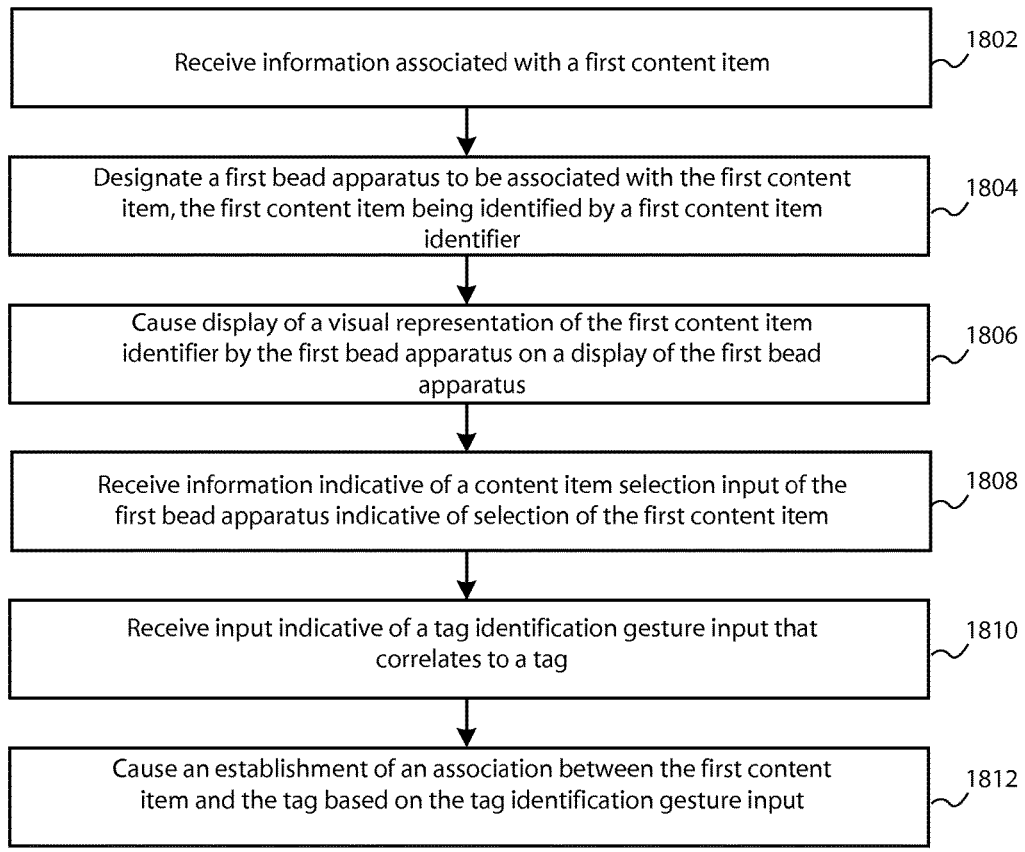
FIG. 18 is a flow diagram illustrating activities associated with causing establishment of an association between a content item and a tag according to at least one example embodiment.

FIG. 18 is a flow diagram illustrating activities associated with causing establishment of an association between a content item and a tag according to at least one example embodiment. In at least one example embodiment, there is a set of operations that corresponds with the activities of FIG. 18. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 18.

At block 1802, the apparatus receives information associated with a first content item, similar as described regarding block 1102 of FIG. 11.

At block 1804, the apparatus designates a first bead apparatus to be associated with the first content item that may be identified by a first content item identifier, similar as described regarding block 1104 of FIG. 11.

At block 1806, the apparatus causes display of a visual representation of the first content item identifier by the first bead apparatus on a display of the first bead apparatus, similar as described regarding block 1106 of FIG. 11.

At block 1808, the apparatus receives information indicative of a content item selection input of the first bead apparatus indicative of selection of the first content item, similar as described regarding block 1108 of FIG. 11.

At block 1810, the apparatus receives input indicative of a tag identification gesture input that correlates to a tag. The receipt, the indication, the tag identification gesture input, the correlation, and the tag may be similar as described regarding FIGS. 5A-5D, FIGS. 6A-6J, FIGS. 7A-7B, FIGS. 8A-8D, and

FIG. 9.

At block 1812, the apparatus causes an establishment of an association between the first content item and the tag based, at least in part, on the tag identification gesture input. The causation of establishment of the association may be similar as described regarding FIGS. 7A-7B and FIGS. 8A-8D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1210 of FIG. 12 may be performed after block 1212 of FIG. 12. Furthermore, if desired, one or more of the above-described functions may be optional or may be combined. For example, block 1208 of FIG. 12 may be optional and/or combined with block 1206 of FIG. 12.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor; and
at least one memory comprising computer program code, the memory and the computer program code configured to, working with the processor, cause the apparatus to perform at least the following:
receive information associated with a plurality of content items stored on a memory device, wherein the plurality of content items comprise at least a first content item;
designate a plurality of bead apparatuses to be associated with respective content items of the plurality of content items, each content item being identified by a respective content item identifier, wherein at least a first bead apparatus of the plurality of bead apparatuses is associated with the first content item, wherein the plurality of bead apparatuses are physically connected to each other via a strand, wherein each of the plurality of bead apparatuses is rotatable about the strand independently of any of the other of the plurality of bead apparatuses, wherein an order of the plurality of bead apparatuses relative to each other on the strand correlates to at least one of a chronological or sequential relationship of characteristics of respectively associated content items, and wherein the characteristics are stored on the memory device;
cause display of a visual representation of the first content item identifier by the first bead apparatus on a display of the first bead apparatus, wherein the visual representation comprises at least one of a thumbnail image of the first content item, a textual representation of the first content item, or metadata associated with the first content item;
receive information indicative of a content item selection input of the first bead apparatus indicative of selection of the first content item;
cause display of at least one tag candidate from a plurality of tag candidates that are potential descriptors associated with the first content item;
receive input indicative of a tag selection input that identifies the displayed at least one tag candidate as the selected tag; and tag the first content item by causing an establishment of an association between the first content item and the selected tag based, at least in part, on the tag selection input.

2. The apparatus of claim 1, wherein the apparatus is the first bead apparatus.

3. The apparatus of claim 1, wherein the memory comprises computer program code configured to, working with the processor, cause the apparatus to perform:
receipt of information associated with a second content item;
designation of a second bead apparatus to be associated with the second content item, the second content item being identified by a second content item identifier; and
causation of display of a visual representation of the second content item identifier by the second bead apparatus.

4. The apparatus of claim 1, wherein the memory comprises computer program code configured to, working with the processor, cause the apparatus to perform:
receipt of a rotation input of the first bead apparatus relative to the strand; and
causation of display of another of the plurality of tag candidates by the first bead apparatus based, at least in part, on the rotation input.

5. The apparatus of claim 1, wherein the memory comprises computer program code configured to, working with the processor, cause the apparatus to perform:
receipt of a tag candidate termination input; and
causation of termination of display of the tag candidate by the first bead apparatus based, at least in part, on the tag candidate termination input.

6. The apparatus of claim 1, wherein the memory comprises computer program code configured to, working with the processor, cause the apparatus to perform:
receipt of input indicative of another tag selection input that identifies another tag; and
causation of an establishment of an association between the first content item and the other tag based, at least in part, on the other tag selection input.

7. The apparatus of claim 1, wherein the memory comprises computer program code configured to, working with the processor, cause the apparatus to perform causation of display of a visual representation of a tag candidate by a tagging bead apparatus configured on the strand, and distinct from the first bead apparatus, wherein the tag selection input relates to an input that identifies the tag candidate as the tag.

8. The apparatus of claim 1, wherein the memory further comprises computer program code configured to, working with the processor, cause the apparatus to perform:
causing display, by the first bead apparatus, of a visual representation of a tag candidate from the plurality of tag candidates, wherein the tag selection input relates to an input that identifies the tag candidate as the tag.

9. The apparatus of claim 1, wherein the memory comprises computer program code configured to, working with the processor, cause the apparatus to perform:
causing at least the visual representation of the first content item or the first bead apparatus to be visually distinguished from other visual representations of other content items or other bead apparatus of the plurality of bead apparatus, thereby signifying the first content item as the content item to be tagged according to the tag selection input.

10. The apparatus of claim 1, wherein the strand runs through the plurality of bead apparatuses, such that at least the first bead apparatus comprises at least two openings through which the strand runs.

11. The apparatus of claim 1, wherein a strand segment of the strand connects two of the plurality of bead apparatuses, such that a length of the strand segment correlates to a spacing between the two of the plurality of bead apparatuses.

12. A method comprising:
receiving information associated with a plurality of content items stored on a memory device, wherein the plurality of content items comprise at least a first content item;
designating a plurality of bead apparatuses, configured on a strand, to be associated with respective content items of the plurality of content items, each content item being identified by a respective content item identifier, wherein at least a first bead apparatus of the plurality of bead apparatuses is associated with the first content item, wherein the plurality of bead apparatuses are physically connected to each other via the strand, wherein each of the plurality of bead apparatuses is rotatable about the strand independently of any of the other of the plurality of bead apparatuses, wherein an order of the plurality of bead apparatuses relative to each other on the strand correlates to at least one of a chronological or sequential relationship of characteristics of respectively associated content items, and wherein the characteristics are stored on the memory device;
causing display of a visual representation of the first content item identifier by the first bead apparatus on a display of the first bead apparatus, wherein the visual representation comprises at least one of a thumbnail image of the first content item, a textual representation of the first content item, or metadata associated with the first content item;
receiving information indicative of a content item selection input of the first bead apparatus indicative of selection of the first content item;
causing display of at least one tag candidate from a plurality of tag candidates that are potential descriptors associated with the first content item;
receiving input indicative of a tag selection input that identifies the displayed at least one tag candidate as the selected tag; and
tagging the first content item by causing an establishment of an association between the first content item and the selected tag based, at least in part, on the tag selection input.

13. The method of claim 12, further comprising:
receiving of information associated with a second content item;
designation of a second bead apparatus to be associated with the second content item, the second content item being identified by a second content item identifier; and
causing display of a visual representation of the second content item identifier by the second bead apparatus.

14. The method of claim 12, further comprising:
receipt of a rotation input of the first bead apparatus relative to the strand; and
causation of display of another of the plurality of tag candidates by the first bead apparatus based, at least in part, on the rotation input.

15. The method of claim 12, further comprising causation of display of a visual representation of a tag candidate by a tagging bead apparatus configured on the strand, and distinct from the first bead apparatus, wherein the tag selection input relates to an input that identifies the tag candidate as the tag.

16. The method of claim 12, further comprising:
causing display, by the first bead apparatus, of a visual representation of a tag candidate from the plurality of tag candidates, wherein the tag selection input relates to an input that identifies the tag candidate as the tag.

17. At least one non-transitory computer-readable medium encoded with instructions that, when executed by a processor, perform:
receiving information associated with a plurality of content items stored on a memory device, wherein the plurality of content items comprise at least a first content item;
designating a plurality of bead apparatuses, configured on a strand, to be associated with respective content items of the plurality of content items, each content item being identified by a respective content item identifier, wherein at least a first bead apparatus of the plurality of bead apparatuses is associated with the first content item, wherein the plurality of bead apparatuses are physically connected to each other via the strand, wherein each of the plurality of bead apparatuses is rotatable about the strand independently of any of the other of the plurality of bead apparatuses, wherein an order of the plurality of bead apparatuses relative to each other on the strand correlates to at least one of a chronological or sequential relationship of characteristics of respectively associated content items, and wherein the characteristics are stored on the memory device;
causing display of a visual representation of the first content item identifier by the first bead apparatus on a display of the first bead apparatus, wherein the visual representation comprises at least one of a thumbnail image of the first content item, a textual representation of the first content item, or metadata associated with the first content item;
receiving information indicative of a content item selection input of the first bead apparatus indicative of selection of the first content item;
causing display of at least one tag candidate from a plurality of tag candidates that are potential descriptors associated with the first content item;
receiving input indicative of a tag selection input that identifies a tag; and
tagging the first content item by causing an establishment of an association between the first content item and the tag based, at least in part, on the tag selection input.

18. The non-transitory computer-readable medium of claim 17, wherein the medium is further encoded with instructions that, when executed by the processor, perform:
receipt of information associated with a second content item;
designation of a second bead apparatus to be associated with the second content item, the second content item being identified by a second content item identifier; and
causation of display of a visual representation of the second content item identifier by the second bead apparatus.

19. The non-transitory computer-readable medium of claim 17, wherein the medium is further encoded with instructions that, when executed by the processor, perform causation of display of a visual representation of a tag candidate by a tagging bead apparatus configured on the strand, and distinct from the first bead apparatus, wherein the tag selection input relates to an input that identifies the tag candidate as the tag.

20. The non-transitory computer-readable medium of claim 17, wherein the medium is further encoded with instructions that, when executed by the processor, perform:
causing display, by the first bead apparatus, of a visual representation of a tag candidate from the plurality of tag candidates, wherein the tag selection input relates to an input that identifies the tag candidate as the tag.

* * * * *